(12) United States Patent
Stettiner et al.

(10) Patent No.: US 11,852,747 B2
(45) Date of Patent: Dec. 26, 2023

(54) APPARATUS AND METHOD OF ELIMINATING SETTLING TIME DELAYS IN A RADAR SYSTEM

(71) Applicant: ARBE ROBOTICS LTD., Tel Aviv (IL)

(72) Inventors: Yoram Stettiner, Keren Maharal (IL); Noam Arkind, Givatayim (IL); Abraham Bauer, Hod Hasharon (IL)

(73) Assignee: Arbe Robotics Ltd.

( * ) Notice: Subject to any disclaimer, the term of this patent is extended or adjusted under 35 U.S.C. 154(b) by 516 days.

(21) Appl. No.: 17/261,128

(22) PCT Filed: Jun. 29, 2019

(86) PCT No.: PCT/IL2019/050720
§ 371 (c)(1),
(2) Date: Jan. 18, 2021

(87) PCT Pub. No.: WO2020/016878
PCT Pub. Date: Jan. 23, 2020

(65) Prior Publication Data
US 2021/0293923 A1 Sep. 23, 2021

(30) Foreign Application Priority Data

Jul. 19, 2018 (IL) .......................... 260695

(51) Int. Cl.
*G01S 7/40* (2006.01)
*G01S 13/34* (2006.01)
*G01S 13/931* (2020.01)

(52) U.S. Cl.
CPC .............. *G01S 7/40* (2013.01); *G01S 7/4017* (2013.01); *G01S 13/343* (2013.01); *G01S 13/931* (2013.01)

(58) Field of Classification Search
CPC ........ G01S 7/40; G01S 7/4017; G01S 13/343; G01S 13/931; G01S 13/42
See application file for complete search history.

(56) References Cited

U.S. PATENT DOCUMENTS 3,603,989 A 9/1971 Caspers
3,981,012 A 9/1976 Brault
(Continued)

FOREIGN PATENT DOCUMENTS

CN 1967286 A 5/2007
CN 101950851 A 1/2011
(Continued)

OTHER PUBLICATIONS

Comparative Performance Analysis of Hamming, Hanning and Blackman Window by Prajoy Podder at International Journal of Computer Applications (0975-8887) vol. 96—No. 18, Jun. 2014 (Year: 2014).
(Continued)

*Primary Examiner* — Marc Anthony Armand
(74) *Attorney, Agent, or Firm* — Zaretsky Group PC; Howard Zaretsky

(57) ABSTRACT

A novel and useful system and method for eliminating settling time delays in a radar system. In one embodiment, a plurality of oscillators is provided with a single transmitter. In an alternative embodiment, a plurality of transmitters is provided, each with its own oscillator. In either case, more than a single oscillator is used, whereby startup or turn on transients associated with one oscillator are allowed to settle out while another oscillator is being used. The two or more oscillators switch off and/or alternate or rotate such that oscillator settling time between chirp transmissions from the radar is substantially or completely eliminated. In a radar system having two transmitters, when the chirp propagation time window for the first transmitter is complete, the first
(Continued)

transmitter is disconnected from the receive channel and the second transmitter is connected to the antenna and receive channel without having to wait for the second transmitter to settle since it was allowed to settle beforehand.

19 Claims, 16 Drawing Sheets

(56) References Cited

U.S. PATENT DOCUMENTS

| | | | |
|---|---|---|---|
| 4,166,980 A | 9/1979 | Apostolos | |
| 4,197,540 A * | 4/1980 | Riggs | G01S 13/32 342/201 |
| 4,490,720 A | 12/1984 | Kuntman | |
| 4,494,083 A | 1/1985 | Josefsson | |
| 4,926,185 A | 5/1990 | Wittenberg | |
| 5,063,603 A | 11/1991 | Burt | |
| 5,424,742 A | 6/1995 | Long | |
| 5,430,445 A | 7/1995 | Peregrim | |
| 5,442,362 A | 8/1995 | Zwarts | |
| 5,694,130 A | 12/1997 | Suzuki | |
| 5,923,280 A | 7/1999 | Farmer | |
| 5,955,992 A | 9/1999 | Shattil | |
| 6,028,548 A | 2/2000 | Farmer | |
| 6,104,673 A | 8/2000 | Cole | |
| 6,172,939 B1 | 1/2001 | Cole | |
| 6,204,803 B1 | 3/2001 | Uehara | |
| 6,363,033 B1 | 3/2002 | Cole | |
| 6,614,384 B2 | 9/2003 | Hall | |
| 6,822,604 B2 | 11/2004 | Hall | |
| 6,828,929 B2 | 12/2004 | Barbella | |
| 6,865,216 B1 | 3/2005 | Beamish | |
| 6,888,887 B1 | 5/2005 | Shattil | |
| 6,989,782 B2 | 1/2006 | Walker | |
| 7,071,868 B2 | 7/2006 | Woodington | |
| 7,119,733 B2 | 10/2006 | Schoeberl | |
| 7,129,886 B2 | 10/2006 | Hall | |
| 7,148,840 B2 | 12/2006 | Dooi | |
| 7,308,043 B1 | 12/2007 | Frank | |
| 7,372,394 B1 | 5/2008 | Woodell | |
| 7,528,765 B1 | 5/2009 | Woodell | |
| 7,541,968 B2 | 6/2009 | Hall | |
| 7,639,171 B2 | 12/2009 | Alland | |
| 7,804,445 B1 | 9/2010 | Fiore | |
| 7,835,455 B2 | 11/2010 | Shattil | |
| 7,859,450 B2 | 12/2010 | Shirakawa | |
| 7,903,038 B2 | 3/2011 | Tietjen | |
| 8,035,038 B2 | 10/2011 | Cheng | |
| 8,175,134 B1 | 5/2012 | Giallorenzi | |
| 8,184,040 B2 | 5/2012 | Takase | |
| 8,599,062 B2 | 12/2013 | Szajnowski | |
| 8,762,139 B2 | 6/2014 | Furuta | |
| 8,803,732 B2 | 8/2014 | Antonik | |
| 8,970,425 B2 | 3/2015 | Nogueira-Nine | |
| 8,976,061 B2 | 3/2015 | Chowdhury | |
| 9,250,322 B2 | 2/2016 | Newman | |
| 9,341,705 B2 | 5/2016 | Yannone | |
| 9,557,585 B1 | 1/2017 | Yap | |
| 9,645,228 B1 | 5/2017 | Doerry | |
| 9,791,564 B1 | 10/2017 | Harris | |
| 9,880,275 B2 | 1/2018 | Jeong | |
| 10,078,129 B2 | 9/2018 | Sugino | |
| 10,082,570 B1 | 9/2018 | Izadian | |
| 10,094,920 B2 | 10/2018 | Rao | |
| 10,168,419 B2 | 1/2019 | Trummer | |
| 10,359,504 B2 | 7/2019 | Fetterman | |
| 10,451,723 B2 | 10/2019 | Chiu | |
| 11,199,617 B2 | 12/2021 | Hakobyan | |
| 11,277,902 B2 | 3/2022 | Snir | |
| 2002/0016547 A1 | 2/2002 | Bang | |
| 2002/0044082 A1 | 4/2002 | Woodington | |
| 2002/0130807 A1 | 9/2002 | Hall | |
| 2003/0151476 A1 | 8/2003 | Salmela | |
| 2004/0021599 A1 | 2/2004 | Hall | |
| 2004/0150552 A1 | 8/2004 | Barbella | |
| 2004/0164891 A1 | 8/2004 | Schoeberl | |
| 2004/0196172 A1 | 10/2004 | Wasiewicz | |
| 2005/0083199 A1 | 4/2005 | Hall | |
| 2005/0156780 A1 | 7/2005 | Bonthron | |
| 2005/0232182 A1 | 10/2005 | Shattil | |
| 2006/0012511 A1 | 1/2006 | Dooi | |
| 2007/0040728 A1 | 2/2007 | Nishimura | |
| 2007/0171123 A1 | 7/2007 | Nakano | |
| 2007/0205847 A1 | 9/2007 | Kushta | |
| 2008/0111686 A1 | 5/2008 | Hall | |
| 2008/0136718 A1 | 6/2008 | Tietjen | |
| 2008/0258964 A1 | 10/2008 | Schoeberl | |
| 2008/0284641 A1 | 11/2008 | Spreadbury | |
| 2008/0317345 A1 | 12/2008 | Wiedemann | |
| 2009/0079617 A1 | 3/2009 | Shirakawa | |
| 2009/0085800 A1 | 4/2009 | Alland | |
| 2010/0074620 A1 | 3/2010 | Linnartz | |
| 2010/0141508 A1 | 6/2010 | Nguyen | |
| 2011/0122014 A1 | 5/2011 | Szajnowski | |
| 2011/0279669 A1 | 11/2011 | Longstaff | |
| 2012/0056780 A1 | 3/2012 | Antonik | |
| 2012/0112955 A1 | 5/2012 | Ando | |
| 2012/0146846 A1 | 6/2012 | Antonik | |
| 2012/0169523 A1 | 7/2012 | Lee | |
| 2012/0235859 A1 | 9/2012 | Hayase | |
| 2012/0313810 A1 | 12/2012 | Nogueira-Nine | |
| 2013/0009806 A1 | 1/2013 | Newman | |
| 2013/0027240 A1 | 1/2013 | Chowdhury | |
| 2013/0257670 A1 | 10/2013 | Sovero | |
| 2014/0022113 A1 | 1/2014 | Nogueira-Nine | |
| 2014/0079248 A1 | 3/2014 | Short | |
| 2014/0105043 A1 | 4/2014 | Reves Balleste | |
| 2014/0211438 A1 | 7/2014 | Lin | |
| 2014/0218226 A1 | 8/2014 | Raz | |
| 2014/0320231 A1 | 10/2014 | Seler | |
| 2014/0355385 A1 | 12/2014 | Inagaki | |
| 2015/0042507 A1 | 2/2015 | Jeong | |
| 2015/0061928 A1 | 3/2015 | Cornic | |
| 2015/0268329 A1 | 9/2015 | Yannone | |
| 2015/0323650 A1 | 11/2015 | Schuman | |
| 2016/0018511 A1 | 1/2016 | Nayyar | |
| 2016/0025839 A1 | 1/2016 | Trummer | |
| 2016/0061942 A1 | 3/2016 | Rao | |
| 2016/0084941 A1 | 3/2016 | Arage | |
| 2016/0131738 A1 | 5/2016 | Prechtel | |
| 2016/0139254 A1 | 5/2016 | Wittenberg | |
| 2016/0187477 A1 | 6/2016 | Wang | |
| 2016/0285611 A1 | 9/2016 | Fischer | |
| 2016/0291146 A1 | 10/2016 | Wang | |
| 2016/0334502 A1 | 11/2016 | Ali | |
| 2016/0377711 A1 | 12/2016 | Arage | |
| 2017/0131394 A1 | 5/2017 | Roger | |
| 2017/0219689 A1 | 8/2017 | Hung | |
| 2017/0307744 A1 | 10/2017 | Loesch | |
| 2017/0343648 A1 | 11/2017 | Trotta | |
| 2018/0045819 A1 | 2/2018 | Cornic | |
| 2018/0074168 A1 | 3/2018 | Subburaj | |
| 2018/0095162 A1 | 4/2018 | Fetterman | |
| 2018/0095173 A1 | 4/2018 | Kurono | |
| 2018/0149736 A1 | 5/2018 | Alland | |
| 2018/0159246 A1 | 6/2018 | Raphaeli | |
| 2018/0166794 A1 | 6/2018 | Raphaeli | |
| 2018/0172816 A1 | 6/2018 | Chiu | |
| 2018/0188317 A1* | 7/2018 | Maiellaro | G01S 7/4056 |
| 2018/0204358 A1 | 7/2018 | An | |
| 2018/0350751 A1 | 12/2018 | Sun | |
| 2019/0004167 A1 | 1/2019 | Rao | |
| 2019/0050372 A1 | 2/2019 | Zeng | |
| 2019/0212428 A1 | 7/2019 | Santra | |
| 2019/0235066 A1 | 8/2019 | Iida | |
| 2019/0265346 A1 | 8/2019 | Hakobyan | |
| 2019/0324136 A1 | 10/2019 | Amadjikpe | |
| 2019/0339382 A1 | 11/2019 | Hess | |
| 2020/0003884 A1 | 1/2020 | Arkind | |
| 2020/0011968 A1 | 1/2020 | Hammes | |
| 2020/0176393 A1 | 6/2020 | Ketterson | |
| 2020/0241672 A1 | 7/2020 | Kushnir | |
| 2020/0301002 A1 | 9/2020 | Wu | |

(56) References Cited

U.S. PATENT DOCUMENTS

| | | |
|---|---|---|
| 2020/0388578 A1 | 12/2020 | Lim |
| 2020/0393536 A1 | 12/2020 | Stettiner |
| 2021/0156980 A1 | 5/2021 | Stettiner |
| 2021/0156981 A1 | 5/2021 | Stettiner |
| 2021/0156982 A1 | 5/2021 | Stettiner |
| 2021/0184340 A1 | 6/2021 | Stav |
| 2021/0263147 A1 | 8/2021 | Bauer |
| 2021/0275056 A1 | 9/2021 | McMahon |
| 2021/0318413 A1 | 10/2021 | Arkind |
| 2021/0320425 A1 | 10/2021 | Arkind |

FOREIGN PATENT DOCUMENTS

| | | |
|---|---|---|
| CN | 102866401 A | 1/2013 |
| CN | 104793192 A | 7/2015 |
| CN | 105814262 A | 7/2016 |
| CN | 105842700 A | 8/2016 |
| CN | 106100696 A | 11/2016 |
| CN | 106249219 A | 12/2016 |
| CN | 107356920 A | 11/2017 |
| CN | 107683422 A | 2/2018 |
| CN | 108089163 A | 5/2018 |
| DE | 102013216251 A1 | 2/2015 |
| DE | 102015218538 A1 | 3/2017 |
| DE | 102016224900 A1 | 6/2018 |
| EP | 0132795 A2 | 2/1985 |
| EP | 3165941 A1 | 5/2017 |
| GB | 2462148 A | 2/2010 |
| WO | 2008/143943 A1 | 11/2008 |
| WO | 2013/045232 A1 | 4/2013 |
| WO | 2015/126505 A2 | 8/2015 |
| WO | 2016/188895 A1 | 12/2016 |
| WO | 2017/069679 A1 | 4/2017 |
| WO | 2017/208670 A1 | 12/2017 |
| WO | 2018/138725 A1 | 8/2018 |
| WO | 2018/142395 A1 | 8/2018 |
| WO | 2018/142396 A1 | 8/2018 |

OTHER PUBLICATIONS

U. Prechtel et al.: "Short-Range Mimo Radar System Considerations", 2012 6th European Conference On Antennas and Propagation (EUCAP), Mar. 1, 2012 (Mar. 1, 2012), pp. 1742-1745, Xp055147564, DOI: 10.1109/ EUCAP.2012.6206599, ISBN: 978-1-45-770919-7.

Jason Yu et al: "Multiband chirp synthesis for frequency-hopped FMCW radar", Signals, Systems and Computers, 2009 Conference Record of the Forty-Third Asilomar Conference on, IEEE, Piscataway, NJ, USA, Nov. 1, 2009 (Nov. 1, 2009), pp. 1315-1319, XP031679466, ISBN: 978-1-4244-5825-7.

Laribi Amir et al: "A new height-estimation method using FMCW radar Doppler beam sharpening", 2017 25th European Signal Processing Conference (EUSIPCO), EURASIP, Aug. 28, 2017 (Aug. 28, 2017), pp. 1932-1396, XP033236275, DOI: 10.23919/EUSIPCO.2017.8081546 [retrieved on Oct. 23, 2017].

Miralles E, Multerer T, Ganis A, Schoenlinner B, Prechtel U, Meusling A, Mietzner J, Weckerle C, Esteban H, Vossiek M, Loghik M. Multifunctional and compact 3D FMCW MIMO radar system with rectangular array for medium-range applications. IEEE Aerospace and Electronic Systems Magazine. May 7, 2018;33(4):46-54. Enric Miralles May 7, 2018 (May 7, 2018).

* cited by examiner

APPARATUS AND METHOD OF ELIMINATING SETTLING TIME DELAYS IN A RADAR SYSTEM

FIELD OF THE DISCLOSURE

The subject matter disclosed herein relates to the field of imaging radar, sonar, ultrasound, and other sensors for performing range measurement via FMCW signals and/or angle measurement via digital beam forming and array processing and more particularly relates to a system and method for eliminating settling time delays in a radar system.

BACKGROUND OF THE INVENTION

Recently, applications of radars in the automotive industry have started to emerge. High-end automobiles already have radars that provide parking assistance and lane departure warning to the driver. Currently, there is a growing interest in the self-driving cars and some people consider it to be the main driving force of the automotive industry in the coming years.

Self-driving cars offer a new perspective on the application of the radar technology in automobiles. Instead of only assisting the driver, automotive radars should be capable of taking an active role in the control of the vehicle. They are thus likely to become a key sensor of the autonomous control system of a car.

Radar is preferred over the other alternatives such as sonar or LIDAR as it is less affected by the weather conditions and can be made very small to decrease the effect of the deployed sensor to the vehicle's aerodynamics and appearance. The Frequency Modulated Continuous Wave (FMCW) radar is a type of radar that offers more advantages compared to the others. It ensures the range and velocity information of the surrounded objects can be detected simultaneously. This information is very crucial for the control system of the self-driving vehicle to provide safe and collision-free operation.

A radar system installed in a car should be able to provide the information required by the control system in real-time. A baseband processing system is needed that is capable of providing enough computing power to meet real-time system requirements. The processing system performs digital signal processing on the received signal to extract the useful information such as range and velocity of the surrounded objects.

Currently, vehicles, especially cars, are increasingly equipped with technologies designed to assist the driver in critical situations. Besides cameras and ultrasonic sensors, car makers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in the time and frequency domains, even up to frequencies of 500 GHz.

There is also much interest now in using radar in the realm of autonomous vehicles which is expected to become more prevalent in the future. Millimeter wave automotive radar is suitable for use in the prevention of car collisions and for autonomous driving. Millimeter wave frequencies from 77 to 81 GHz are less susceptible to the interference of rain, fog, snow and other weather factors, dust and noise than ultrasonic radars and laser radars. These automotive radar systems typically comprise a high frequency radar transmitter which transmits a radar signal in a known direction. The transmitter may transmit the radar signal in either a continuous or pulse mode. These systems also include a receiver connected to the appropriate antenna system which receives echoes or reflections from the transmitted radar signal. Each such reflection or echo represents an object struck by the transmitted radar signal.

Advanced driver assistance systems (ADAS) are systems developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. Also, there are aftermarket solutions available. ADAS relies on inputs from multiple data sources, including automotive imaging, LIDAR, radar, image processing, computer vision, and in-car networking. Additional inputs are possible from other sources separate from the primary vehicle platform, such as other vehicles, referred to as vehicle-to-vehicle (V2V), or vehicle-to-infrastructure system (e.g., mobile telephony or Wi-Fi data network).

Advanced driver assistance systems are currently one of the fastest-growing segments in automotive electronics, with steadily increasing rates of adoption of industry-wide quality standards, in vehicular safety systems ISO 26262, developing technology specific standards, such as IEEE 2020 for Image Sensor quality and communications protocols such as the Vehicle Information API.

In recent years many industries are moving to autonomous solutions such as the automotive industry, deliveries etc. These autonomous platforms operate in the environment while interacting with both the stationary and moving objects. For this purpose, these systems require a sensor suite which allows them to sense their surrounding in a reliable and efficient manner. For example, in order for an autonomous vehicle to plan its route on a road with other vehicle on it, the trajectory planner must have a 3D map of the environment with indication of moving objects.

Visual sensors are also degraded by bad weather and poor visibility (e.g., fog, smoke, sand, rain or snow storms, etc.). They are also limited in estimating radial velocities. Light Detection and Ranging devices (LIDARs) are used to measure distance to a target by illuminating that target with a laser light. These, however, are expensive, as most have moving parts and very limited range. Thus, automotive radar is seen as an augmenting and not replacement technology.

In the automotive field, radar sensors are key components for comfort and safety functions, for example adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio.

Up to now, interference has not been considered as a major problem because the percentage of vehicles equipped with radar sensors and therefore the probability of interference was low, and the sensors were used mainly for comfort functions. In this case it may be sufficient to detect interference and turn off the function (i.e. the entire radar) for the duration of the interference. On the contrary, safety functions of future systems require very low failure rates. Therefore, radar-to-radar interference is a major problem in radar sensor networks, especially when several radars are concurrently operating in the same frequency band and mutually interfering with each another. Thus, in spite of a predicted higher number of radar systems, the probability of interference-induced problems must be reduced.

As stated supra, a major challenge facing the application of automotive radar to autonomous driving is the highly likely situation where several unsynchronized radars, possibly from different vendors, operate in geographical proximity and utilize overlapping frequency bands. Note that the currently installed base of radars cannot be expected to synchronize with new automotive radar sensor entrants, nor with any global synchronization schemes.

Prior art digital beam forming FMCW radars are characterized by very high resolutions across radial, angular and Doppler dimensions. Imaging radars are based on the well-known technology of phased arrays, which use a Uniformly Linearly distributed Array (ULA). It is well known that the far field beam pattern of a linear array architecture is obtained using the Fourier transform. It is also well known that range measurement can be obtained by performing a Fourier transform on the de-ramped signal, generated by multiplying the conjugate of the transmitted signal with the received signal. The radar range resolution is determined by the RF bandwidth of the radar and is equal the speed of light 'c' divided by twice the RF bandwidth.

Doppler processing is performed by performing a Fourier transform across the time dimension, and its resolution is limited by the Coherent Processing Interval (CPI). i.e. the total transmission time used for Doppler processing.

A well-known way to reduce the number of antenna elements in an array is by using a MIMO technique known as 'virtual array', where orthogonal waveforms are transmitted from different antennas (usually simultaneously), and by means of digital processing a larger effective array is generated. The shape of this virtual array is the convolution of the transmission and reception antennas.

It is also known that by means of bandpass sampling, the de-ramped signal can be sampled with lower A/D frequencies, while preserving the range information of the targets with the ranges matching the designed bandpass filter.

In a conventional radar system, there is finite amount of time between chirp transmissions. This time comprises a chirp signal propagation time as well as settling time associated with the VCO or local oscillator (LO) in the transmitter. To achieve improved resolution radar sensors, shorter duration chirps are desired. This, however, makes the settling time (also referred to as $T_{GAP}$) a larger percentage of a chirp transmission cycle. For example, consider a five-microsecond chirp duration and a two-microsecond settling time. In this case, the settling time comprises 40% of the chirp.

There is thus a need for a radar system that provides a solution to the above problem. Such a system preferably minimizes $T_{GAP}$ between chirp transmissions and maximizes the transmitted RF in the air.

SUMMARY OF THE INVENTION

The present invention a system and method for eliminating settling time delays in a radar system. The invention is applicable to systems in the field of imaging radar, sonar, ultrasound, and other sensors for performing range measurement via FMCW signals and/or angle measurement via digital beam forming and array processing.

In one embodiment, a plurality of oscillators is provided with a single transmitter. In an alternative embodiment, a plurality of transmitters is provided, each with its own oscillator. In either case, more than a single oscillator is used, whereby startup or turn on transients associated with one oscillator are allowed to settle out while another oscillator is being used. The two or more oscillators switch off and/or alternate or rotate such that oscillator settling time between chirp transmissions from the radar is substantially or completely eliminated.

In a radar system having two transmitters, for example, when the chirp propagation time window for the first transmitter is complete, the first transmitter is disconnected from the receive channel and the second transmitter is connected to the antenna and receive channel without having to wait for the second transmitter to settle since it was allowed to settle beforehand.

There is thus provided in accordance with the invention, a method of eliminating frequency source settling time in a radar system, the method comprising providing a plurality of frequency sources including at least a first frequency source having a first required settling time and a second frequency source having a second required settling time, alternating use of said first frequency source and said second frequency source for transmission and reception, permitting said second frequency source to settle while said first frequency source is in use and permitting said first frequency source to settle while said second frequency source is in use, and wherein alternating use of said first frequency source and said second frequency source eliminates time delays associated with frequency source settling time in the radar system.

There is also provided in accordance with the invention, an apparatus for eliminating frequency source settling time in a radar system, comprising one or more transmitters, one or more receivers, a plurality of frequency sources including at least a first frequency source having a first settling time and a second frequency source having a second settling time, a control circuit operative to alternately couple said first frequency source and said second frequency source to said one or more transmitters and said one or more receivers, thereby permitting said second frequency source to settle while said first frequency source is in use, and permitting said first frequency source to settle while said second frequency source is in use, and wherein alternating use of said first frequency source and said second frequency source eliminates time delays associated with frequency source settling time in the radar system.

There is further provided in accordance with the invention, a method of eliminating frequency source settling time in a radar system, the method comprising providing a plurality of frequency sources including at least a first frequency source having a first settling time and a second frequency source having a second settling time, selecting said first frequency source and allowing settling thereof, first utilizing said first frequency source for a first transmission and reception, selecting said second frequency source and allowing settling thereof while said first frequency source is in use, upon completion of said first transmission and reception, turning off said first frequency source, second utilizing said second frequency source for a second transmission and reception, selecting said first frequency source and allowing settling thereof while said second frequency source is in use upon completion of said second transmission and reception, turning off said second frequency source, continuing with said first utilizing whereby alternating use of said first frequency source and said second frequency source eliminates time delays associated with frequency source settling time in the radar system.

There is also provided in accordance with the invention, an apparatus for eliminating frequency source settling time in a radar system, comprising a plurality of transmitters coupled to one or more antennas, including a first transmitter and a second transmitter, each transmitter including a respective frequency source having a required settling time, a plurality of receivers, a control circuit operative to alternately couple said first transmitter and said second transmitter to said one or more antennas, thereby permitting the frequency source in said second transmitter to settle while said first transmitter is in use, and permitting the frequency source in said first transmitter to settle while said second transmitter is in use, and wherein alternating use of said first transmitter and said second transmitter eliminates time delays associated with frequency source settling time in the radar system.

There is further provided in accordance with the invention, an automotive radar sensor, comprising one or more transmitting antennas, one or more receiving antennas, a plurality of transceivers coupled to said one or more transmitting antennas and said one or more receiving antennas, said transceivers operative to generate and supply transmitting signals to said one or more transmitting antennas and receive signals reflected back to said one or more receiving antennas, a plurality of frequency sources coupled to said plurality of transceivers including at least a first frequency source having a first settling time and a second frequency source having a second settling time, a control circuit operative to alternately couple said first frequency source and said second frequency source to said plurality of transceivers, thereby permitting said second frequency source to settle while said first frequency source is in use, and permitting said first frequency source to settle while said second frequency source is in use, and wherein alternating use of said first frequency source and said second frequency source eliminates time delays associated with frequency source settling time in the automotive radar sensor.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein.

DETAILED DESCRIPTION

Figure 1:
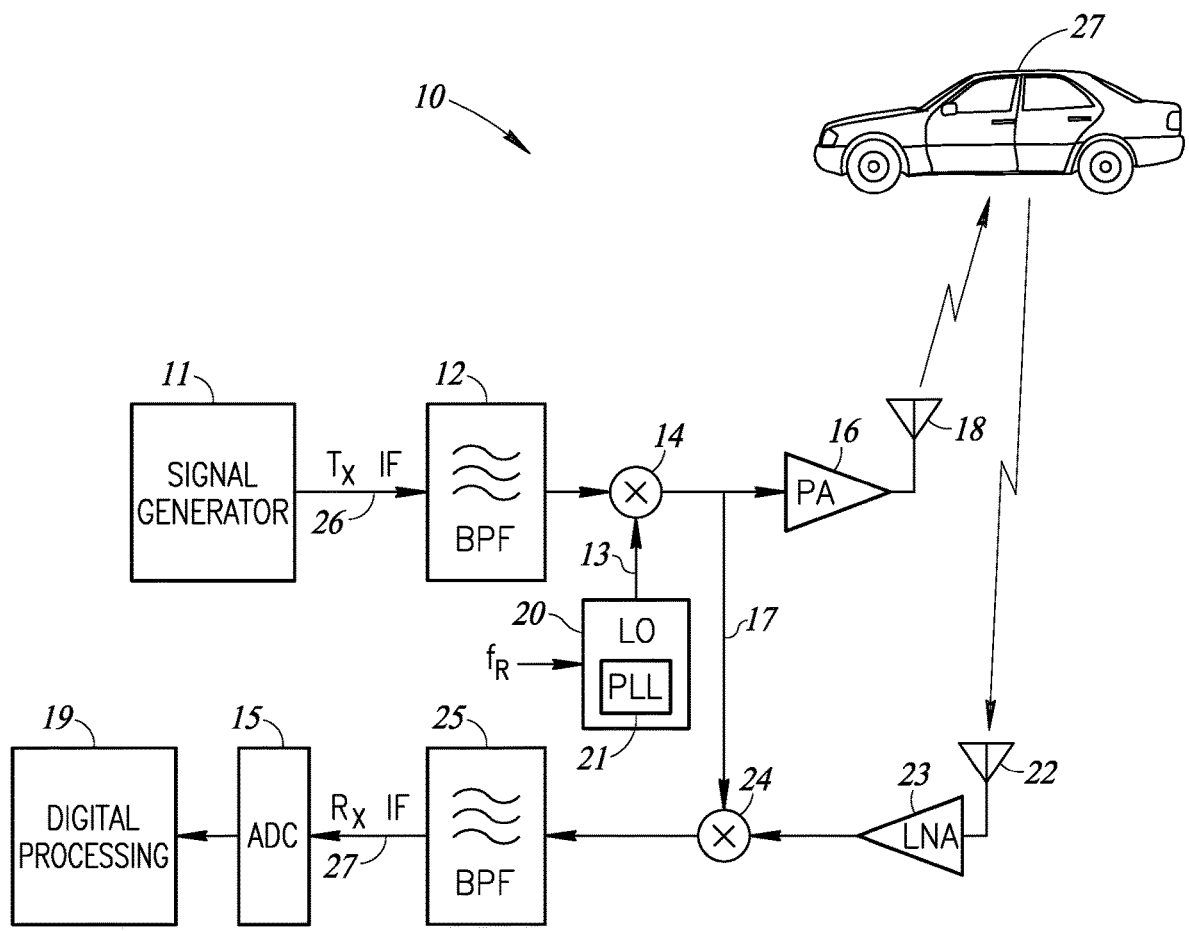
FIG. 1 is a high-level block diagram illustrating a first example radar transceiver.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

A high-level block diagram illustrating a first example radar transceiver is shown in FIG. 1. The radar transceiver, generally referenced 10, comprises a transmit path including band pass filter (BPF) 12 operative to receive a TX intermediate frequency (IF) signal 26. The output of the BPF constitutes one input to mixer 14 with the second input signal being the local oscillator (LO) output signal 13 from the single LO circuit 20. The LO circuit is operative to generate LO signal 13 utilizing phase locked loop (PLL) circuit 21 and input reference frequency $f_R$. The output of the mixer 14 is input to power amplifier (PA) 16 and is also mixed with the received signal in the receiver. The output of the PA is coupled to transmit antenna 18.

The receive path includes antenna 22 coupled to low noise amplifier (LNA) 23. The output of the LNA is fed to one input of the mixer 24 while the output 17 of the TX mixer 14 constitutes the second input to the mixer. The output of the mixer 24 is input to BPF 25 which generates the RX IF signal 27 (i.e. the beat frequency between the transmitted and received chirp signals.

In one embodiment, the radar comprises a time multiplexed MIMO FMCW radar. In an alternative embodiment, a full MIMO FMCW is implemented. Full MIMO radars transmit several separable signals from multiple transmit array elements simultaneously. Those signals need to be separated at each receive channel, typically using a bank of matched filters. The complete virtual array is populated at once.

In time multiplexed MIMO, only one transmit (TX) array element is transmitting at a time. The transmit side is greatly simplified, and there is no need for a bank of matched filters for each receive (RX) channel. The virtual array is progressively populated over the time it takes to transmit from all the TX elements in the array.

Note that time multiplexed MIMO is associated with several problems including coupling between Doppler and the spatial directions (azimuth and elevation). This is solved by randomizing the order in which TX array elements transmit. Starting with an ordered transmit sequence which cycles over all TX elements, then repeated for the CPI duration 'REUSE' times. The TX sequence in each repetition is randomly permuted. Each repetition uses a different permutation. Thus, it is ensured that each TX element is transmitting the same number of times during a CPI, and that the pause between transmission, per each TX elements, is never longer than two periods. This is important in order to keep Doppler sidelobes low. It is marginally beneficial though not necessary to change the permutations from one CPI to the next.

The decoupling effectiveness is largely determined by the number of chirps in the CPI. Hence, another incentive for using short duration chirps. Doppler ambiguities occur at lower target speeds. This is solved by randomizing the transmit (TX) sequence (as described above) and by using relatively short chirps. A lower bound on chirp duration is the propagation delay to the farthest target plus reasonable overlap time. In one embodiment, seven microseconds is a reasonable choice for targets located up to 300 meters away. Note that shorter chirps also increase the required sampling rate as explained in more detail infra.

Regarding sensitivity, this is solved by increasing transmit power, TX and RX gain, obtaining a low noise figure and minimizing processing losses. Reducing the sampling rate has direct and proportional impact on computational complexity and memory requirements. It is preferable to keep the IF sampling rate low to keep complexity, cost and power consumption at reasonable levels. The required sampling rate is determined by the maximum IF (i.e. not RF) bandwidth of each chirp post de-ramping. The maximum IF bandwidth is determined by the chirp slope (i.e. bandwidth over duration) times the propagation delay to the furthest target. Thus, it is preferable to keep the chirp slope low, either by low chirp bandwidth, or by long chirp duration, or a combination of both. This, however, contradicts the requirements for good range resolution (which requires large RF bandwidth) and high Doppler ambiguity (which requires short chirps).

Figure 2:
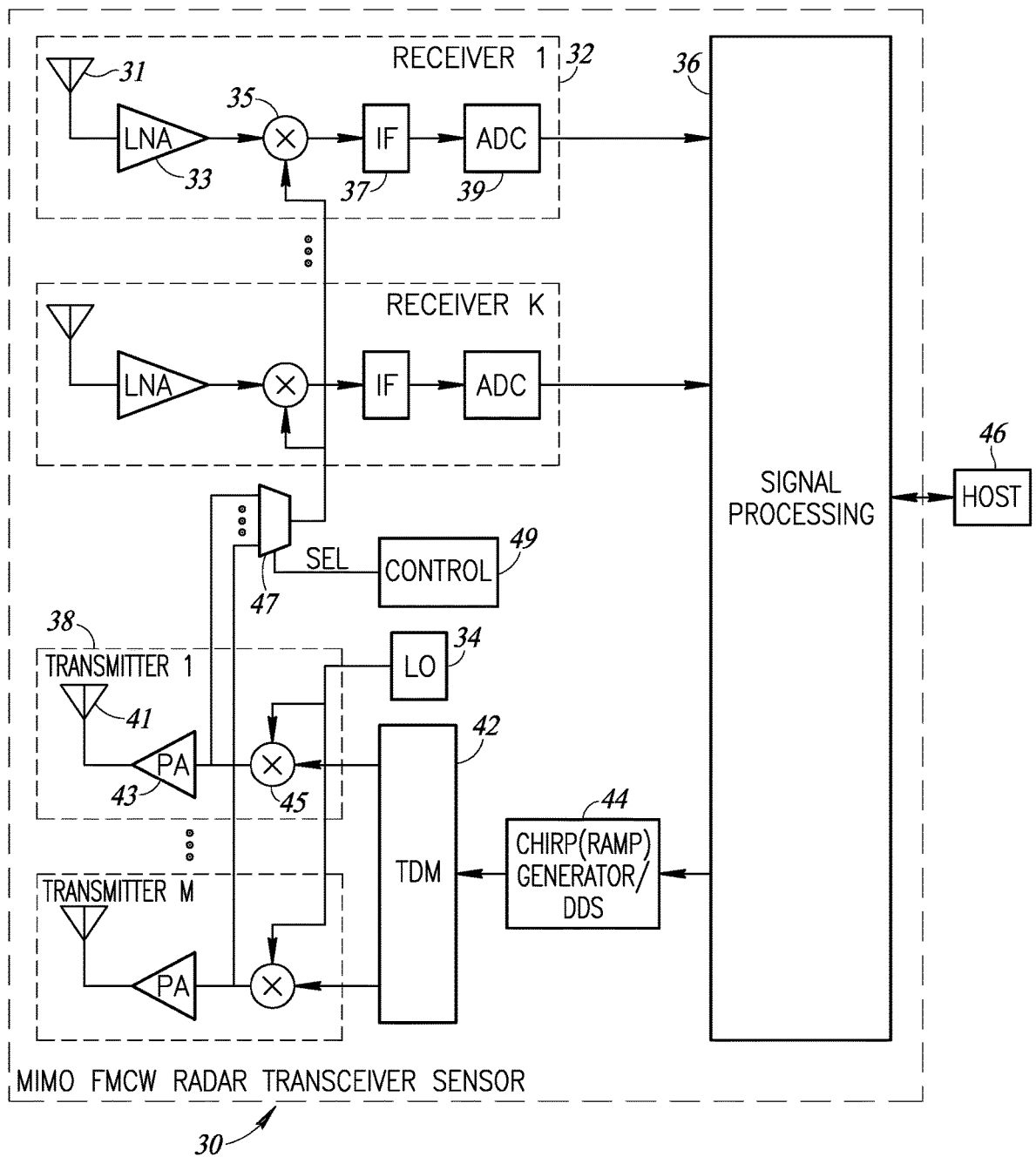
FIG. 2 is a high-level block diagram illustrating a first example MIMO FMCW radar transceiver sensor.
Figure 3:
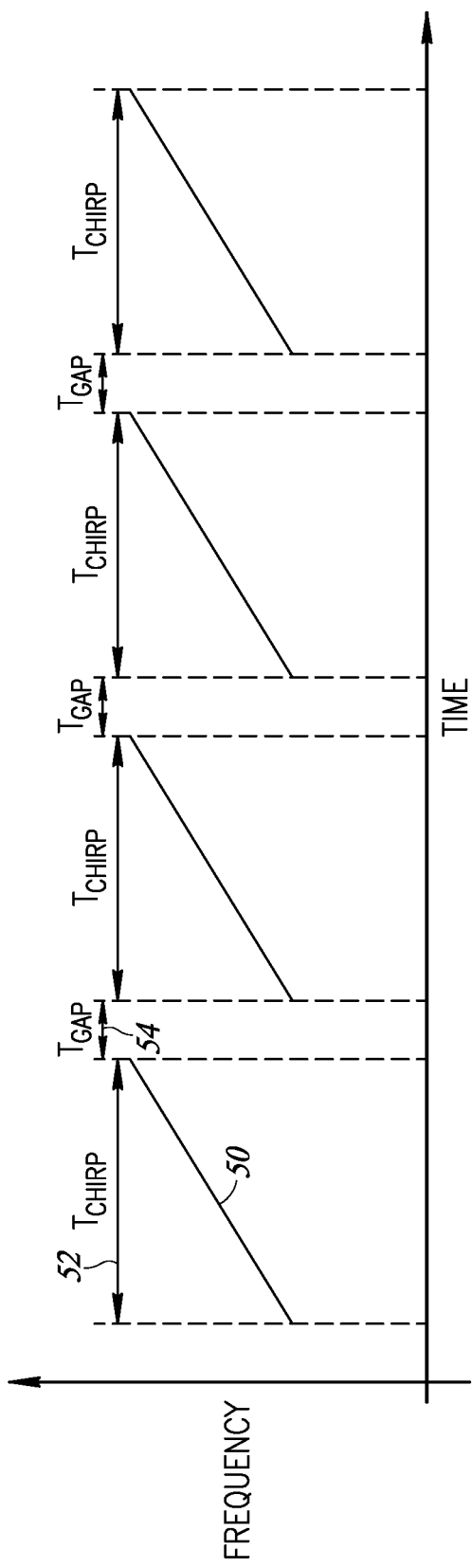
FIG. 3 is a diagram illustrating chirp transmissions with gap periods therebetween.

Frequency modulated continuous wave (FMCW) radars are radars in which frequency modulation is used. The theory of operation of FMCW radar is that a continuous wave with an increasing frequency is transmitted. Such a wave is referred to as a chirp. An example of a chirp waveform 50 is shown in FIG. 3. A high-level block diagram illustrating a first example MIMO FMCW radar transceiver sensor is shown in FIG. 2.

The radar transceiver sensor, generally referenced 30, comprises a plurality of M transmit circuits 38, a plurality of K receive circuits 32, local oscillator (LO) 34, multiplexer 47, control circuit 49, ramp or chirp generator 44, e.g., direct digital synthesizer (DDS), time division multiplexer (TDM) circuit block 42, and signal processing block 36. In operation, the radar transceiver sensor typically communicates with and may be controlled by a host 46. Each transmit block comprises a mixer 45, power amplifier 43, and antenna 41. Each receive block 32 comprises an antenna 31, low noise amplifier (LNA) 33, mixer 35, intermediate frequency (IF) block 37, and analog to digital converter (ADC) 39. In one embodiment, the radar sensor 30 comprises a separate detection wideband receiver (not shown) dedicated to listening. The sensor uses this receiver to detect the presence of in band interfering signals transmitted by nearby radar sensors. The processing block uses knowledge of the detected interfering signals to formulate a response (if any) to mitigate and avoid any mutual interference.

In operation, the LO signal output of LO circuit 34 is mixed with the output of the TDM circuit 42 in each transmitter. The chirp signal output of the mixer 45 in the transmitter is input to its respective PA as well as multiplexer 47. Depending on which transmitter is active, one of the chirp signals is distributed to the mixers 35 in the receivers 32 via multiplexer 47. The select input to the multiplexer is generated by the control block 49.

Signal processing block 36 may comprise any suitable electronic device capable of processing, receiving, or transmitting data or instructions. For example, the processing units may include one or more of: a microprocessor, a central processing unit (CPU), an application-specific integrated circuit (ASIC), field programmable gate array (FPGA), a digital signal processor (DSP), graphical processing unit (GPU), or combinations of such devices. As described herein, the "processor" is meant to encompass a single processor or processing unit, multiple processors, multiple processing units, or other suitably configured computing element or elements.

For example, the processor may comprise one or more general purpose CPU cores and optionally one or more special purpose cores (e.g., DSP core, floating point, etc.). The one or more general purpose cores execute general purpose opcodes while the special purpose cores execute functions specific to their purpose.

Attached or embedded memory comprises dynamic random access memory (DRAM) or extended data out (EDO) memory, or other types of memory such as ROM, static RAM, flash, and non-volatile static random access memory (NVSRAM), removable memory, bubble memory, etc., or combinations of any of the above. The memory stores electronic data that can be used by the device. For example, a memory can store electrical data or content such as, for example, radar related data, audio and video files, documents and applications, device settings and user preferences, timing and control signals or data for the various modules, data structures or databases, and so on. The memory can be configured as any type of memory.

Transmitted and received signals are mixed (i.e. multiplied) to generate the signal to be processed by the signal processing unit 36. The multiplication process generates two signals: one with a phase equal to the difference of the multiplied signals, and the other one with a phase equal to the sum of the phases. The sum signal is filtered out and the difference signal is processed by the signal processing unit. The signal processing unit performs all the required processing of the received digital signals and controls the transmitted signal as well. Several functions performed by the signal processing block include determining range, velocity (i.e. Doppler), elevation, azimuth performing interference detection, mitigation and avoidance, performing simultaneous locating and mapping (SLAM), etc.

Note that FMCW radar offers many advantages compared to the other types of radars. These include (1) the ability to measure small ranges with high accuracy; (2) the ability to simultaneously measure the target range and its relative velocity; (3) signal processing can be performed at relatively low frequency ranges, considerably simplifying the realization of the processing circuit; (4) functioning well in various types of weather and atmospheric conditions such as rain, snow, humidity, fog and dusty conditions; (5) FMCW modulation is compatible with solid-state transmitters, and moreover represents the best use of output power available from these devices; and (6) having low weight and energy consumption due to the absence of high circuit voltages.

When using radar signals in automotive applications, it is desired to simultaneously determine the speed and distance of multiple objects within a single measurement cycle. Ordinary pulse radar cannot easily handle such a task since based on the timing offset between transmit and receive signals within a cycle, only the distance can be determined. If speed is also to be determined, a frequency modulated signal is used, e.g., a linear frequency modulated continuous wave (FMCW) signal. A pulse Doppler radar is also capable of measuring Doppler offsets directly. The frequency offset between transmit and receive signals is also known as the beat frequency. The beat frequency has a Doppler frequency component $f_D$ and a delay component $f_T$. The Doppler component contains information about the velocity, and the delay component contains information about the range. With two unknowns of range and velocity, two beat frequency measurements are needed to determine the desired parameters. Immediately after the first signal, a second signal with a linearly modified frequency is incorporated into the measurement.

Determination of both parameters within a single measurement cycle is possible with FM chirp sequences. Since a single chirp is very short compared with the total measurement cycle, each beat frequency is determined primarily by the delay component $f_T$. In this manner, the range can be ascertained directly after each chirp. Determining the phase shift between several successive chirps within a sequence permits the Doppler frequency to be determined using a Fourier transformation, making it possible to calculate the speed of vehicles. Note that the speed resolution improves as the length of the measurement cycle is increased.

Multiple input multiple output (MIMO) radar is a type of radar which uses multiple TX and RX antennas to transmit and receive signals. Each transmitting antenna in the array independently radiates a waveform signal which is different than the signals radiated from the other antennae. Alternatively, the signals may be identical but transmitted at non-overlapping times. The reflected signals belonging to each transmitter antenna can be easily separated in the receiver antennas since either (1) orthogonal waveforms are used in the transmission, or (2) because they are received at non-overlapping times. A virtual array is created that contains information from each transmitting antenna to each receive antenna. Thus, if we have M number of transmit antennas and K number of receive antennas, we will have M·K independent transmit and receive antenna pairs in the virtual array by using only M+K number of physical antennas. This characteristic of MIMO radar systems results in several advantages such as increased spatial resolution, increased antenna aperture, and higher sensitivity to detect slowly moving objects.

As stated supra, signals transmitted from different TX antennas are orthogonal. Orthogonality of the transmitted waveforms can be obtained by using time division multiplexing (TDM), frequency division multiplexing, or spatial coding. In the examples and description presented herein, TDM is used which allows only a single transmitter to transmit at each time.

A diagram depicting frequency versus time illustrating chirp transmissions with gap periods therebetween is shown in FIG. 3. Both radar transceivers shown in FIGS. 1 and 2 are operative to periodically transmit chirp signals 50. The duration of the chirp is denoted $T_{chirp}$ 52. Due to system constraints of the transmitter, a time gap $T_{gap}$ 54 between chirps exists. This time gap comprises transmitter settling time as well as chirp signal propagation time.

Figure 4:
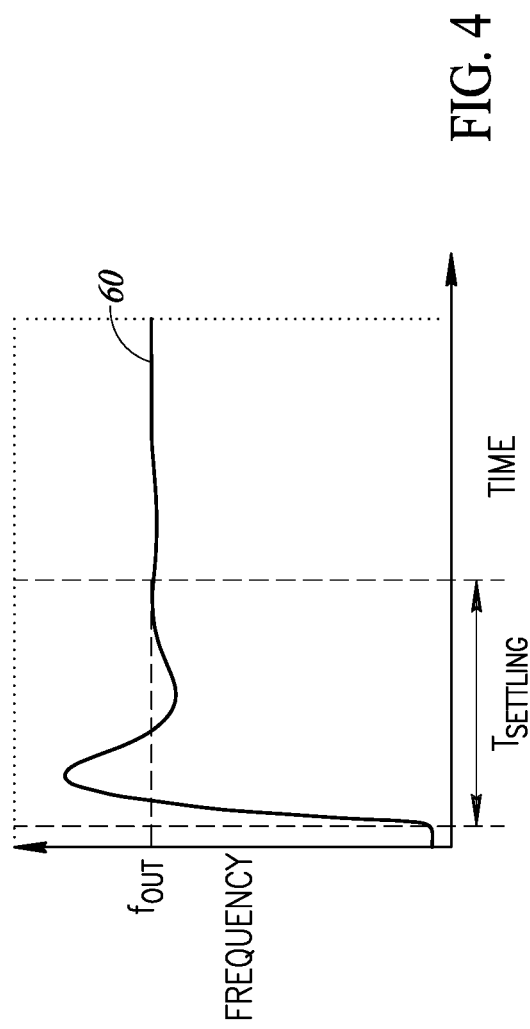
FIG. 4 is a diagram illustrating example transmitter frequency source settling time.

A diagram illustrating example transmitter frequency source settling time is shown in FIG. 4. The signal 60 represents the output frequency $f_{OUT}$ versus time. The transients during settling time $T_{setting}$ stems from the oscillator circuit internals including VCO, PLL, or other circuits turning on and taking a finite amount of time to reach a steady state condition. Note that the objective of the radar system is to transmit the shortest possible chirps to optimize range and resolution while maximizing the $T_{chirp}$ to $T_{gap}$ ratio. In this case, the only parameter than can be reduced is oscillator settling time, or more precisely, PLL settling time. The settling time $T_{setting}$ is defined as the time is takes the PLL to lock. Transmission of the chirp is only possible after the PLL has achieved lock. Note also that the settling time is typically independent of other system parameters and must be considered regardless of the type of system implemented.

Figure 5:
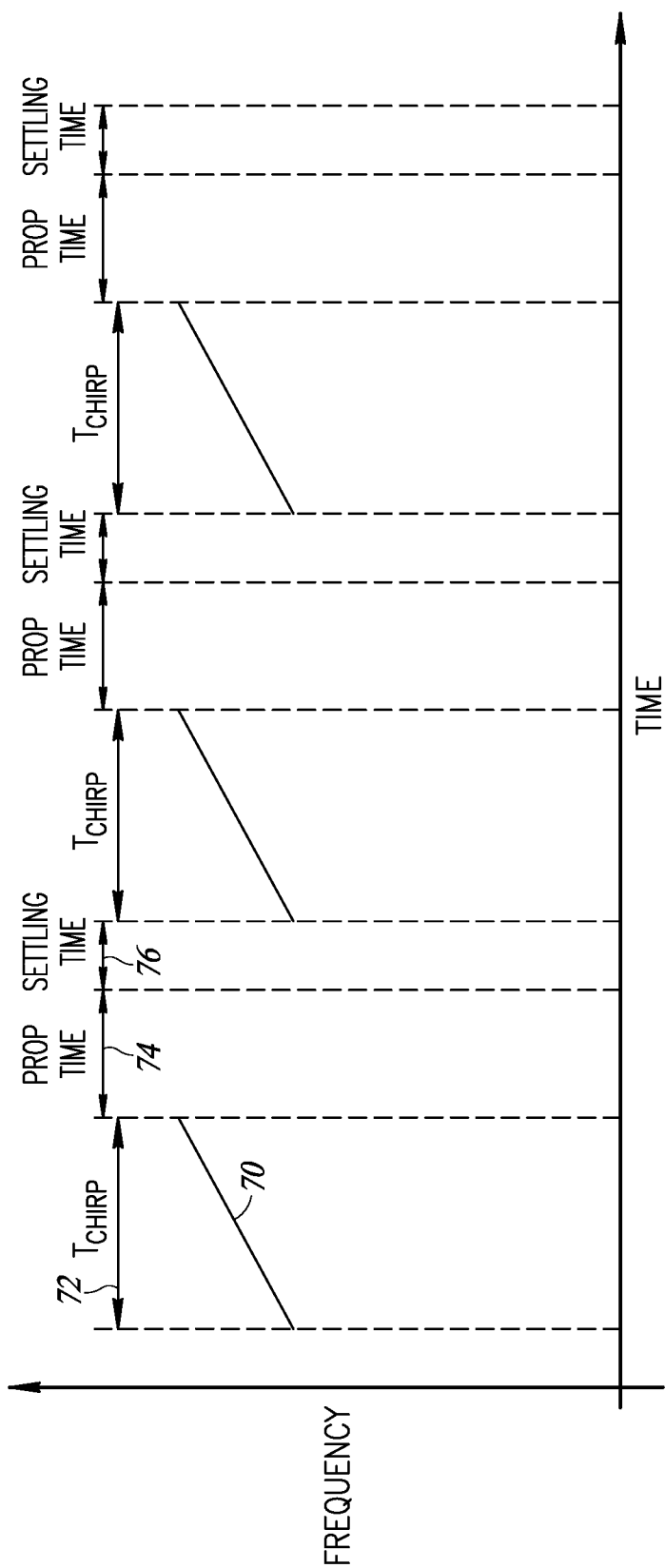
FIG. 5 is a diagram illustrating chirp transmissions with propagation time and frequency source settling time periods therebetween.

A frequency versus time diagram illustrating chirp transmissions with propagation time and frequency source settling time periods therebetween is shown in FIG. 5. The periodic chirp signals 70 having duration $T_{chirp}$ 72 are interspaced with propagation time periods 74 and settling time $T_{setting}$ 76 time periods.

The goal of the present invention is to significantly reduce the gap period $T_{gap}$. In other words, the objective of the radar system is to maximize the transmitted RF in the air while minimizing the 'no transmission' time. The propagation time, however, cannot be changed due to system constraints. Thus, the only way to reduce the gap time is to reduce the settling time $T_{setting}$. In addition, the oscillator frequency cannot be changed or modified during propagation since it is used as the downconverter oscillator in the receiver which is typically a homodyne receiver.

It is noted both transmitter circuits of FIGS. 1 and 2 comprise a single oscillator circuit, e.g., PLL, LO, etc. Thus, in order to reduce and even eliminate the settling time, in one embodiment of the invention, a second oscillator is used. While one oscillator is used for reception of the reflected radar signal, the second oscillator prepares to transmit. In one embodiment, a plurality of oscillators is provided with a single transmitter. In an alternative embodiment, a plurality of transmitters is provided, each with its own oscillator. What is critical is that more than a single oscillator is used, whereby startup or turn on transients associated with one oscillator are allowed to 'settle' out while another oscillator is in use. The two or more oscillators switch off and/or rotate such that oscillator settling time between chirp transmissions is substantially or completely eliminated.

In one embodiment, considering a plurality of transmitters (i.e. two or more), when the chirp propagation time window is complete, the first transmitter is disconnected from the receive channel and the second transmitter is connected to the antenna and receive channel.

Note that for RF built in self-test (RFBIST) purposes, if in the event one of the transmitter channels malfunctions, the radar system had a backup option to operate with a single transmitter but at the expense of introducing settling time between chirps. Thus, given a failure of a transmitter, the system can still operate but the elimination of settling time between chirps is sacrificed.

Figure 6:
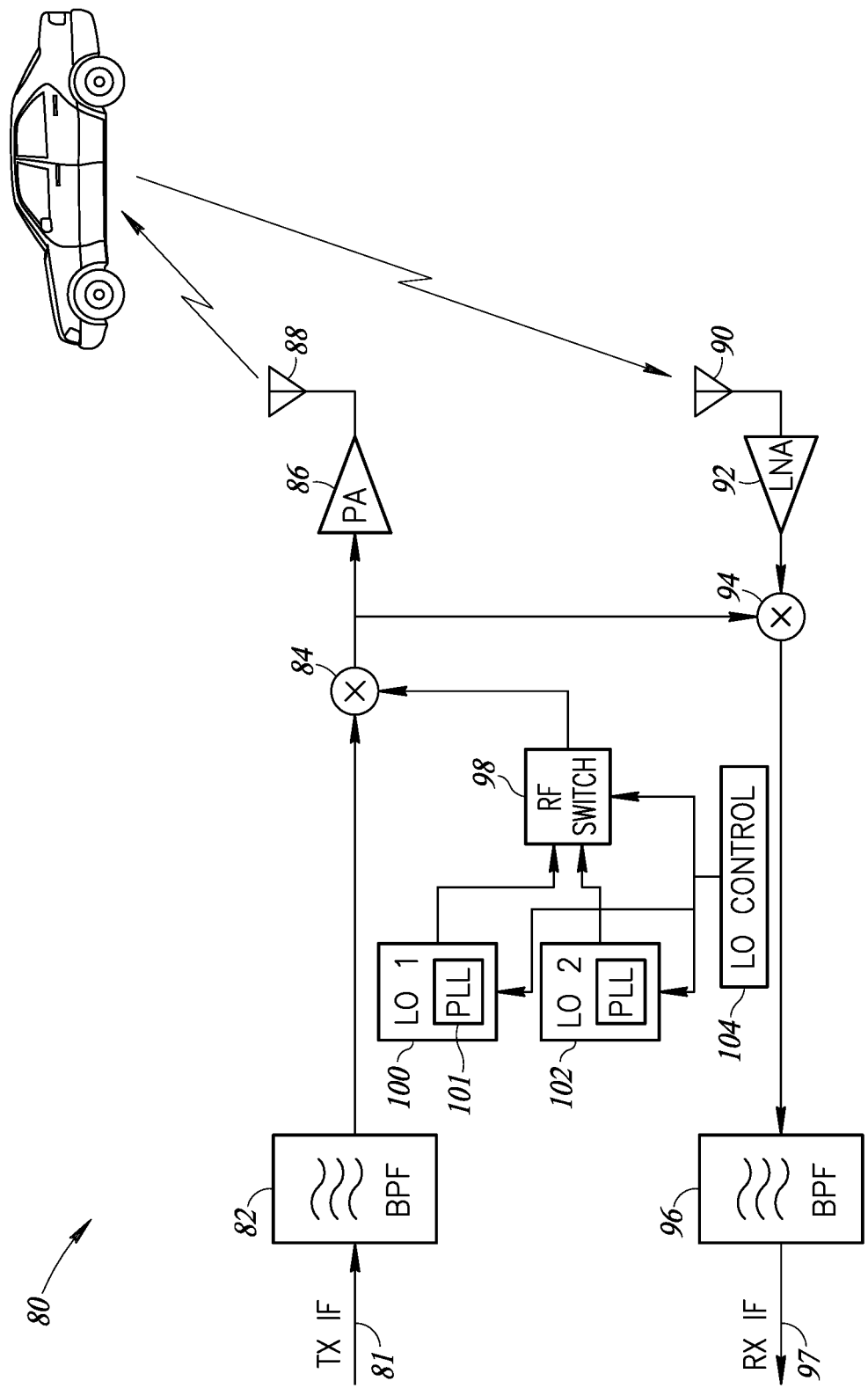
FIG. 6 is a high-level block diagram illustrating a second example radar transceiver incorporating multiple local oscillators (LOs)

A high-level block diagram illustrating a second example radar transceiver incorporating multiple local oscillators (LOs) is shown in FIG. 6. The radar transceiver, generally referenced 80, comprises a transmit path including band pass filter (BPF) 82 operative to receive a TX IF signal 81.

The output of the BPF constitutes one input to mixer 84. The output of the mixer 84 is input to PA 86 and is mixed with the received signal via mixer 94. The output of the PA is coupled to transmit antenna 88.

The receive path includes antenna 90 coupled to LNA 92. The output of the LNA is fed to one input of the mixer 94. The other input is the chirp signal output of mixer 84. The output of the mixer 94 is input to BPF 96 which generates the RX IF signal 97.

In one embodiment, the system comprises dual local oscillators (LOs), namely LO1 100 and LO2 102, each incorporating its own PLL circuit 101. The oscillator signals generated by the two LO circuits are input to an RF switch 98 which is controlled by LO control block 104. The output of the RF switch constitutes the second input to mixer 84. The LO circuits 100, 102 are operative to generate separate LO signals utilizing independent PLL circuits 21 and input reference frequencies $f_R$.

Figure 7:
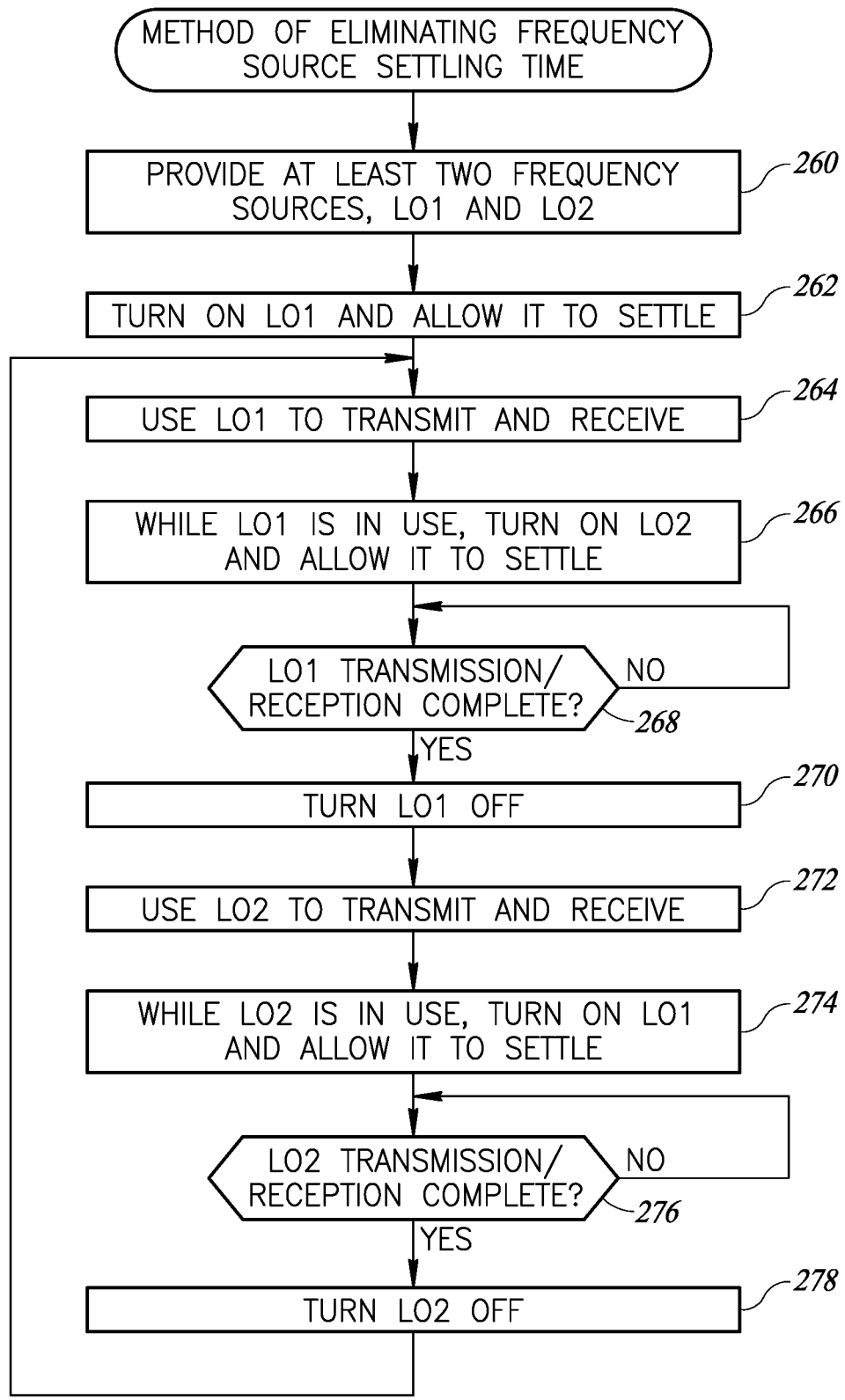
FIG. 7 is a flow diagram illustrating a method of eliminating frequency source settling time.

In operation, the LO circuits alternate as described in more detail below. A flow diagram illustrating a method of eliminating frequency source settling time is shown in FIG. 7. At least two intendent frequency sources LO1 and LO2 are provided (step 260). LO1 is turned on and allowed to settle (step 262). Once settled, LO1 is then used for transmit and receive (step 264). While LO1 is in use, LO2 is turned on and allowed to settle (step 266). Note that LO2 is turned on early enough that it will settle before LO1 is to be turned off.

Once LO1 transmission and reception is complete (step 268), LO1 is turned off (step 270). LO2 is then used for transmit and receive (step 272). While LO2 is in use, LO1 is turned on and allowed to settle (step 274). Once LO2 transmission and reception are complete (step 276), LO2 is turned off (step 278) and the method repeats.

Figure 8:
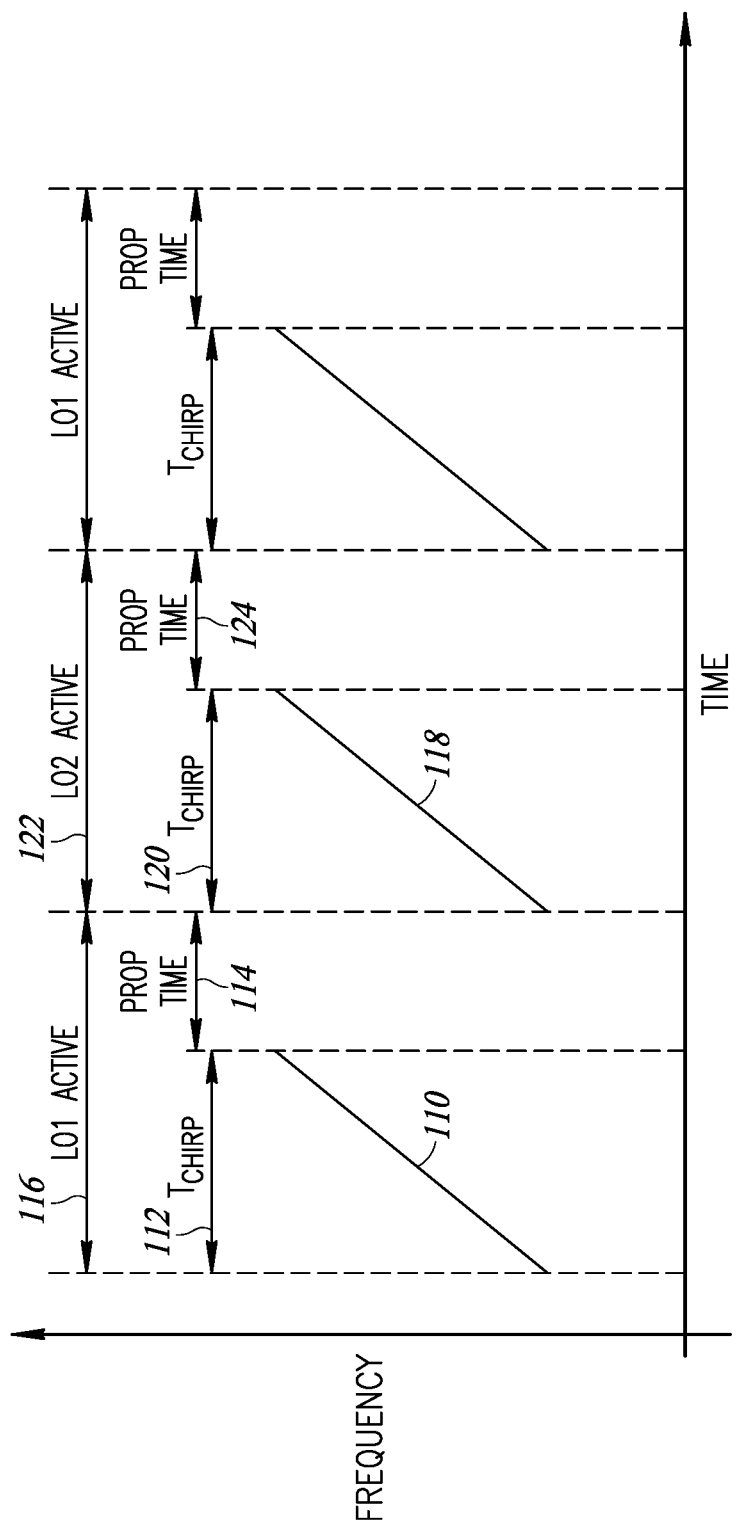
FIG. 8 is a diagram illustrating an example chirp transmission with frequency source settling time eliminated.

A diagram illustrating frequency versus time for an example chirp transmission with frequency source settling time eliminated is shown in FIG. 8. In one example embodiment, consider a two transmitter radar system. LO1 is turned is used to generate and transmit chirp 110 during $T_{chirp}$ 112. A propagation time period 114 follows the end of the transmission of the chirp whereby the receiver listens for echo return signals. At the end of the propagation time 114, LO1 is turned off. LO1 is on, however, for the entire chirp transmission duration as well as the propagation time period 114 for a combined time period 116. LO1 must turn on some time before the transmitter starts transmission of the chirp 110. This is to allow for settling time. The LO1 signal is used in the homodyne receiver during the chirp time period and the propagation time period.

Once the LO1 propagation time period is complete, LO2 is used to generate and transmit chirp 118 during $T_{chirp}$ 120. A propagation time period 124 follows the end of the transmission of the chirp whereby the receiver listens for echo return signals. At the end of the propagation time 124, LO2 is turned off. LO2 is on, however, for the entire chirp transmission duration as well as the propagation time period 124 for a combined time period 122. LO2 must turn on some time before the transmitter starts transmission of the chirp 118. This is to allow for settling time. The LO2 signal is used in the homodyne receiver during the chirp time period and the propagation time period.

In this fashion, the two local oscillators (i.e. transmitters) alternate turning on and off at appropriate times so as to eliminate any settling time that would normally be present (see FIG. 5) absent two or more transmitters or a single transmitter with multiple local oscillators.

Figure 9:
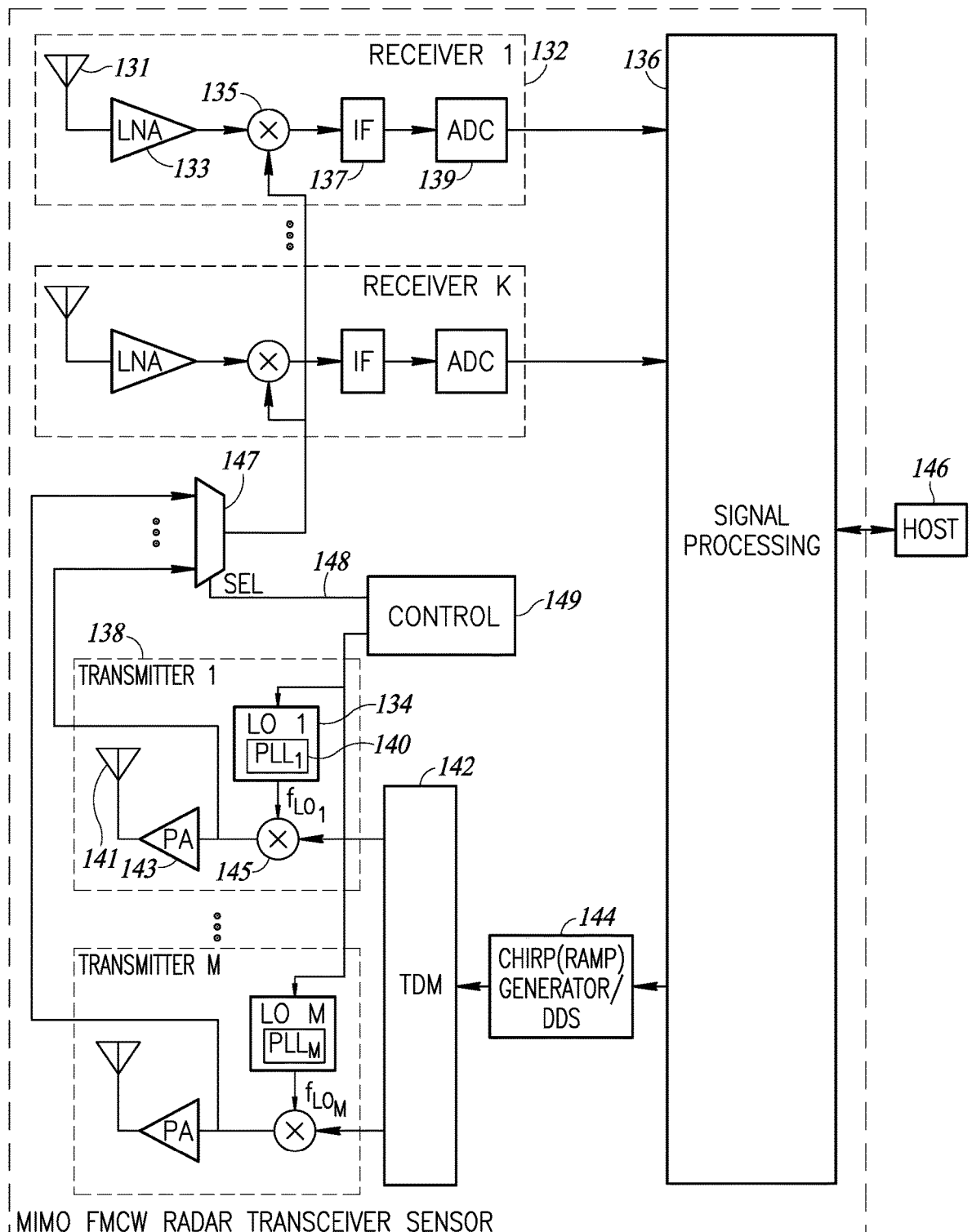
FIG. 9 is a high-level block diagram illustrating a second example MIMO FMCW radar transceiver sensor incorporating multiple LOs.

A high-level block diagram illustrating a second example MIMO FMCW radar transceiver sensor incorporating multiple LOs is shown in FIG. 9. The radar transceiver sensor, generally referenced 130, comprises a plurality of M transmit circuits 138, a plurality of K receive circuits 132, ramp or chirp generator 144, e.g., direct digital synthesizer (DDS), TDM circuit block 142, multiplexer 147, control circuit 149, and signal processing block 136. In operation, the radar transceiver sensor typically communicates with and may be controlled by a host 146. Each transmit block comprises a mixer 145, local oscillator 134, power amplifier 143, and antenna 141. Each receive block 132 comprises an antenna 131, low noise amplifier (LNA) 133, mixer 135, intermediate frequency (IF) block 137, and analog to digital converter (ADC) 139. In one embodiment, the radar sensor 130 comprises a separate detection wideband receiver (not shown) dedicated to listening. The sensor uses this receiver to detect the presence of in band interfering signals transmitted by nearby radar sensors. The processing block uses knowledge of the detected interfering signals to formulate a response (if any) to mitigate and avoid any mutual interference.

In one embodiment, each of the M transmitters comprises a separate local oscillator circuit 134, each LO circuit incorporating an individual PLL 140. Thus, transmitter 1 comprises LO1 which is operative to generate an oscillator signal $f_{LO1}$, transmitter 2 comprises LO2 which is operative to generate an oscillator signal $f_{LO2}$, and so on through transmitter M which comprises LOM which is operative to generate an oscillator signal $f_{LOM}$. Control of the local oscillator circuits in the M transmitters is provided by the control block 149. The control circuit is operative to configure, inter alia, the oscillator frequency of each LO circuit 134. The chirp signals output of each of the mixer circuits 145 are input to multiplexer 147 which is operative to select one of the TX output signals for mixing with the receive signal in each receiver.

On the receive side, the M output chirp signals are input to a multiplexer 147 whose SEL line 148 is controlled by the control block 149 or other control circuit. Depending on the local oscillator and transmitter currently selected, the multiplexer is appropriately configured to pass the output chirp signal generated by the operative transmitter to mixers 135 in the K receivers.

Thus, the radar transceiver is operative to provide a separate LO signal to the M transmitters where the LO signal generated by each transmitter is independent and distinct from that of all other transmitters.

Note that in this embodiment, the chirp signal is generated by the chirp generator 144 and upconverted via mixing with the PLL signal. It is appreciated by one skilled in the art that alternatively in this and other embodiments disclosed herein the PLL itself can be directly modulated to generate the chirp signal without departing from the scope of the invention.

Figure 10:
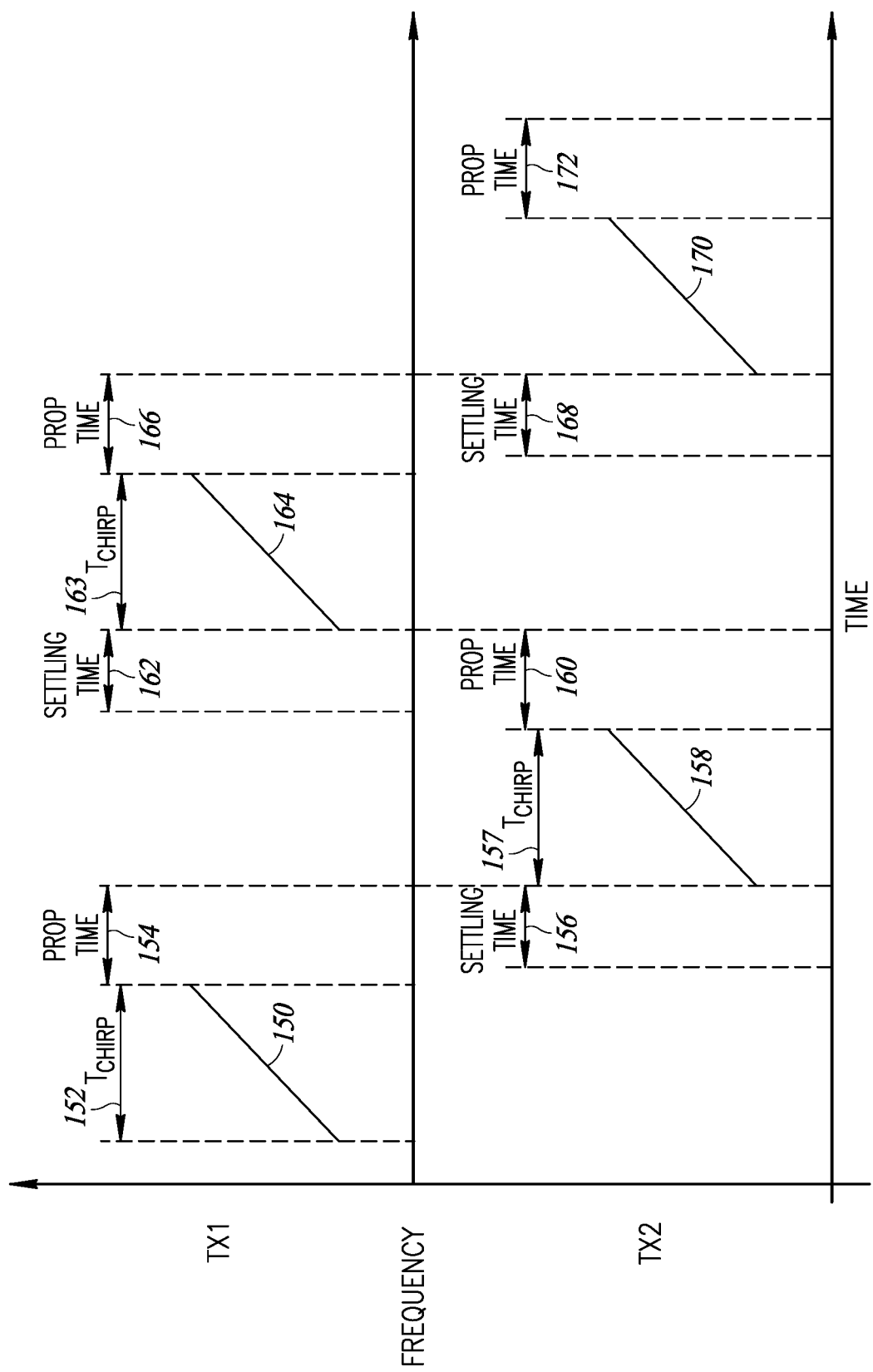
FIG. 10 is a diagram illustrating an example chirp transmission with frequency source settling time eliminated utilizing at least two transmitters.

A diagram illustrating an example chirp transmission with frequency source settling time eliminated utilizing at least two transmitters is shown in FIG. 10. In this example, two transmitters, i.e. TX1 and TX2, alternate transmissions. Thus, while one transmitter is transmitting, the other is settling and preparing to transmit.

Consider TX1 transmitting chirp 150 during $T_{chirp}$ 152. The transmitter turns off and the receiver continues listening for echo returns during propagation time 154. At some point in time before the end of the propagation time period 154, TX2 oscillator (i.e. LO2) turns on and is allowed to settle during settling time period 156. Once the TX1 propagation time interval 154 is complete, TX2 immediately turns on and begins transmitting chirp 158 during $T_{chirp}$ 157. The LO2 oscillator signal continues to be used in the receiver until the propagation time interval 160 is complete.

At some point in time before the end of the propagation time period 160, TX1 oscillator (i.e. LO1) turns on and is allowed to settle during settling time period 162. Once the TX2 propagation time interval 160 is complete, TX1 immediately turns on and begins transmitting chirp 164 during $T_{chirp}$ 163. The LO1 oscillator signal continues to be used in the receiver until the propagation time interval 166 is complete. At that time, LO2 has settled and TX2 begins transmitting chirp 170.

Thus, the use of at least two transmitters and corresponding local oscillators, e.g., TX1, TX2 and LO1, LO2, permits the elimination of the settling time that normally would be present between chirps in a system having a single LO and transmitter.

Figure 11:
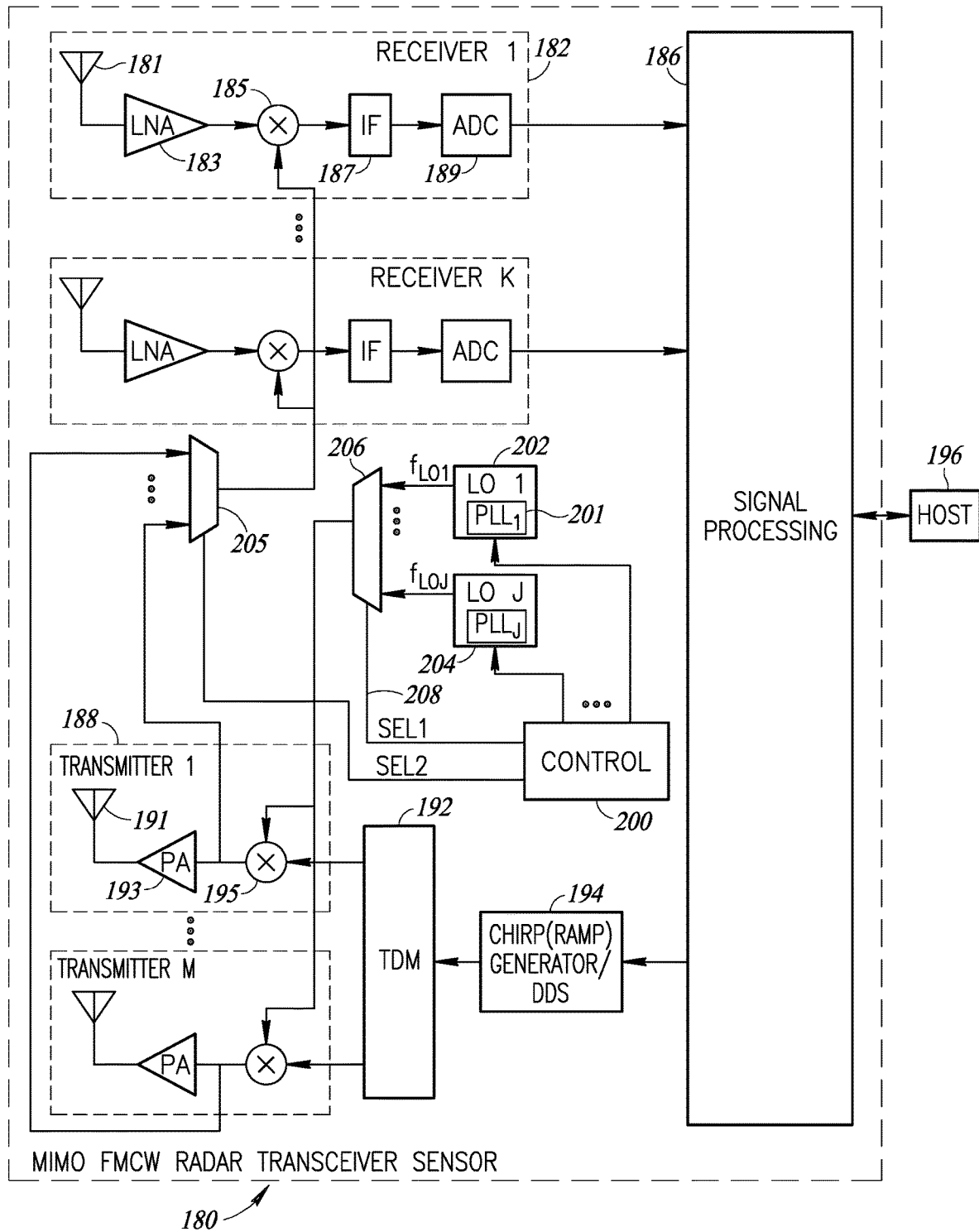
FIG. 11 is a high-level block diagram illustrating a third example radar transceiver incorporating multiple local oscillators (LOs)

A high-level block diagram illustrating a third example radar transceiver incorporating multiple local oscillators (LOs) is shown in FIG. 11. The radar transceiver sensor, generally referenced 180, comprises a plurality of M transmit circuits 188, a plurality of K receive circuits 182, ramp or chirp generator 194, e.g., direct digital synthesizer (DDS), TDM circuit block 192, control circuit 200, and signal processing block 186. In operation, the radar transceiver sensor typically communicates with and may be controlled by a host 196. Each transmit block comprises a mixer 195, power amplifier 193, and antenna 191. Each receive block 182 comprises an antenna 181, low noise amplifier (LNA) 183, mixer 185, intermediate frequency (IF) block 187, and analog to digital converter (ADC) 189. In one embodiment, the radar sensor 180 comprises a separate detection wideband receiver (not shown) dedicated to listening. The sensor uses this receiver to detect the presence of in band interfering signals transmitted by nearby radar sensors. The processing block uses knowledge of the detected interfering signals to formulate a response (if any) to mitigate and avoid any mutual interference.

In one embodiment, the radar transceiver comprises K local oscillator circuits 202, with each LO circuit incorporating an individual PLL 201. Local oscillator LO1 is operative to generate an oscillator signal $f_{LO1}$, local oscillator LO2 is operative to generate an oscillator signal $f_{LO2}$, and so on through local oscillator LOJ which is operative to generate oscillator signal $f_{LOJ}$. Control of the J local oscillator circuits is provided by the control block 200. The control circuit is operative to configure, inter alia, the oscillator frequency of each LO circuit 202. The oscillator signals $f_{LO1}$ through $f_{LOJ}$ output of the J local oscillator circuits, respectively, are input to a multiplexer 206 whose SEL1 line 208 is provided by the control block 200 or other suitable control circuit.

In this embodiment, all M transmitters are operative to use the same local oscillator signal selected by the control block. While one of the LO signals is being used, another LO circuit is turned on and allowed to settle. Once the current propagation interval is complete, the control block is operative to configure the multiplexer 206 to select the next LO signal to be fed to the transmitters. Thus, the radar transceiver is operative to provide a common LO signal to the M transmitters.

The chirp signals output of the mixer 195 in each transmitter is input to a multiplexer 205 whose output is input to the mixer 185 in each of the K receivers where it is mixed with the received signal output from the LNA. The control circuit 200 is operative to generate the select line SEL2 that is used to select the chirp signal from one of the M transmitters.

Figure 12A:
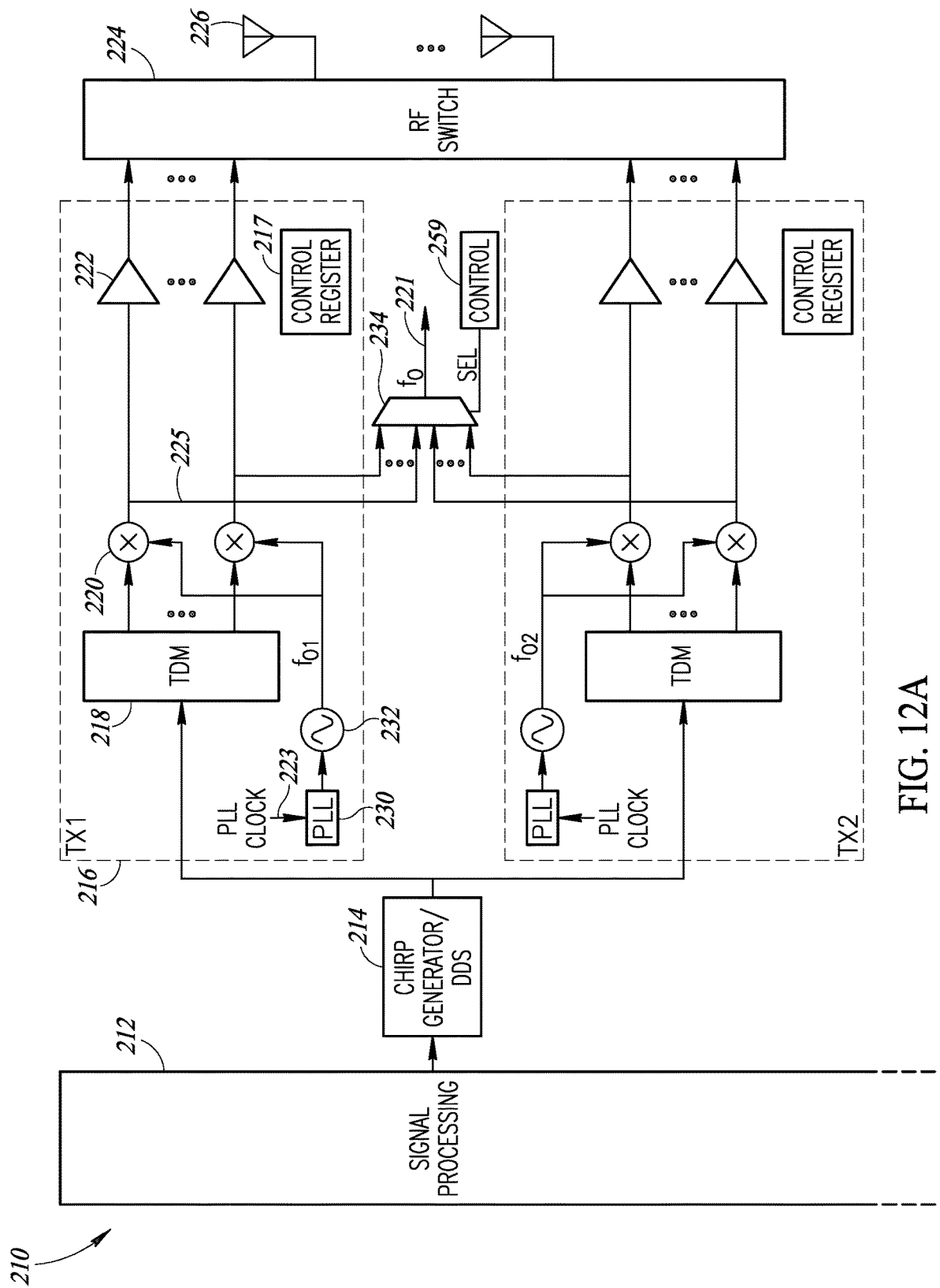
FIGS. 12A and 12B are a high-level block diagram illustrating a fourth example radar transceiver incorporating multiple local oscillators (LOs)
Figure 12B:
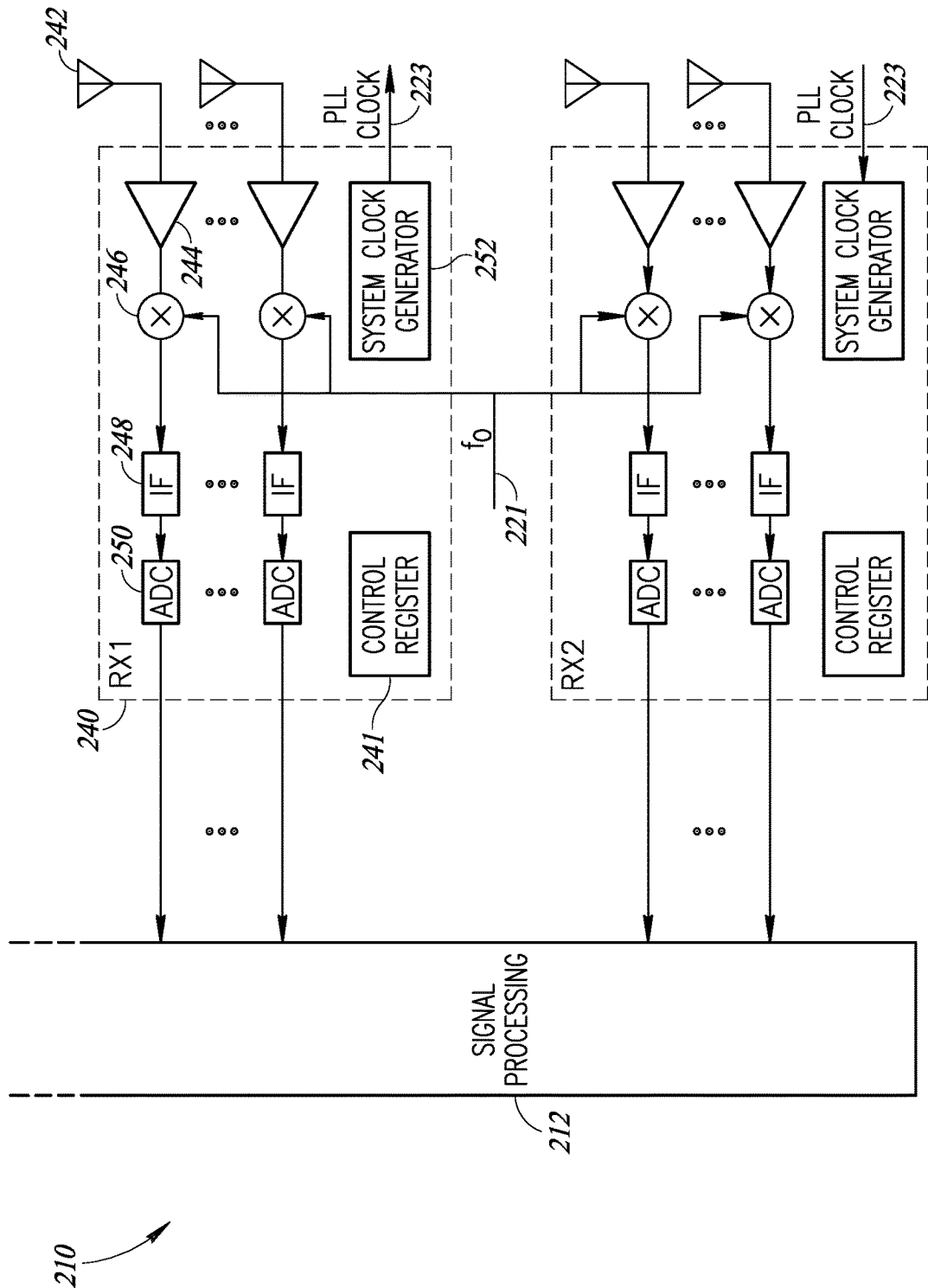

A high-level block diagram illustrating a fourth example radar transceiver incorporating multiple local oscillators (LOs) is shown in FIGS. 12A and 12B. The radar transceiver, generally referenced 210, comprises a plurality of transmitter integrated circuits (ICs, chips, devices, etc.) 216, a plurality of receiver chips 240, chirp generator/DDS 214, all coupled to signal processing block 212. In one embodiment, the example transceiver 210 is suitable for use in a FMCW MIMO radar. The radar transceiver 210 is operative to perform the method of the present invention as described in connection with FIG. 7 supra.

Each transmitter chip, TX1, TX2, comprises a plurality of transmitter channels, PLL 230 adapted to receive a reference PLL clock 223, local oscillator (i.e. frequency source) 232 whose output signal $f_{O1}$ is optionally coupled to a frequency multiplier (not shown), e.g., X1, X2, X4, X8, etc., TDM block 218, a plurality of mixers 220 adapted to receive the LO signal, a plurality of power amplifiers 222, and control register 217. The TX2 chip is operative to generate a separate LO signal $f_{O2}$. The outputs of the PAs of both TX1 and TX2 are input to an RF switch 224 which steers RF signals to the plurality of transmit antennas 226 in accordance with a control signal. The chirp signals output of the mixers 220 in the transmitters 216 (i.e. TX1 and TX2) are input to multiplexer 234 whose select control is generated by control block 259. The output $f_O$ 221 is mixed with the received signal in the receivers.

The control registers 217 are operative to configure and control the properties and parameters of the circuits contained on the transmitter chips. For example, parameters such as carrier frequency, chirp duration, frequency gradient of the chirp, etc.

Each receiver chip, RX1, RX2, comprises a plurality of channels, a plurality of LNAs 244 adapted to receive input signals from antennas 242, mixers 246, IF blocs 248 and ADCs 250. Each receiver chip also optionally comprises a frequency multiplier circuit (not shown), e.g., X1, X2, X4, X8, etc., adapted to receive LO signal $f_O$ 221 before input to the mixers 246.

In one embodiment, each receiver chip comprises a system clock generator circuit 252 operative to generate PLL reference clock signal 223 which is input to local oscillator circuits 232 in the transmitter chips. The receiver chip also comprises a control register 241. The control registers 241 are operative to configure and control the properties and parameters of the circuits contained on the receiver chips, such as PLL clock frequency 223, etc.

In one embodiment, the transceiver 210 is used in an automotive radar FMCW MIMO based system. Such a system requires a plurality of transmitter and receiver channels to achieve desired range, azimuth, elevation and velocity. The higher the number of channels, the better the resolution performance. In the example shown herein, the system comprises two receiver chips and two transmitter chips. Each TX chip comprises a plurality of transmitter channels and each RX chip comprises a plurality of receiver channels. It is appreciated, however, that the system can include more than two receiver and/or transmitter chips. Each TX and RX chip is operable as part of a larger system adapted to achieve maximum system performance. In one embodiment, in a complete system there is a single control channel that may be integrated in a RX chip. The control channel is operative to configure the entire setup of both TX and RX devices. When the control channel is integrated in a RX device, one of the RX devices functions as a master device and all other RX devices are slave devices.

Figure 13:
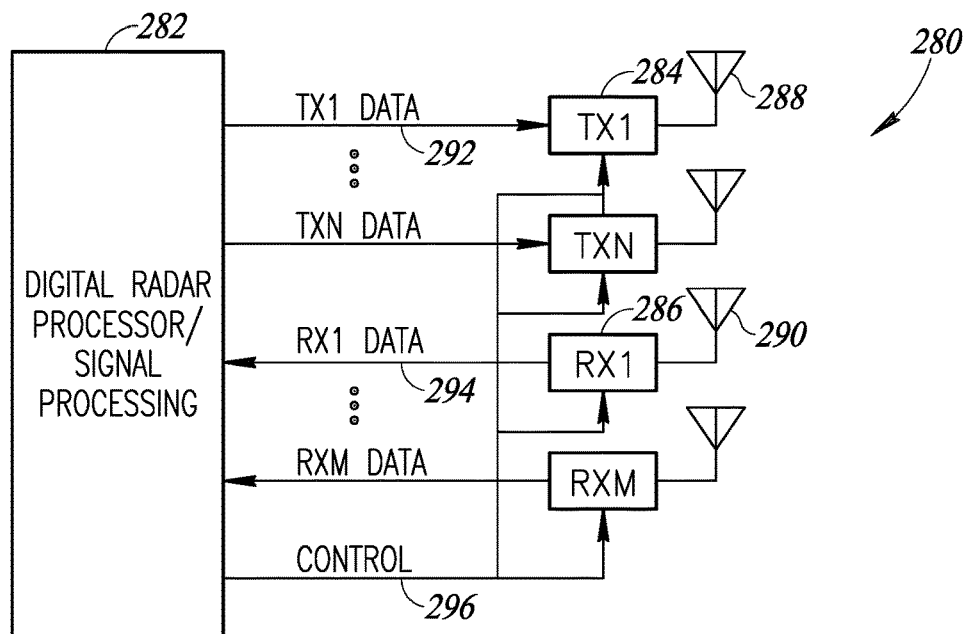
FIG. 13 is a high-level block diagram illustrating an example radar system incorporating a plurality of receivers and transmitters.

A high-level block diagram illustrating an example radar system incorporating a plurality of receivers and transmitters is shown in FIG. 13. The radar system, generally referenced 280, comprises a digital radar processor (DRP) for performing, inter alia, signal processing functions, a plurality N of transmitter devices TX1 to TXN 284, each coupled to an antenna 288, a plurality M of receiver devices RX1 to RXN 286, each coupled to an antenna 290. TX data lines 292 connect the DRP to the transmitter devices, RX lines 294 connect the receiver devices to the DRP, and control signal 296 are provided by the DRP to each of the transmitter and receiver devices, 284, 286, respectively. Note that N and M may be any positive integer greater than one.

Figure 14:
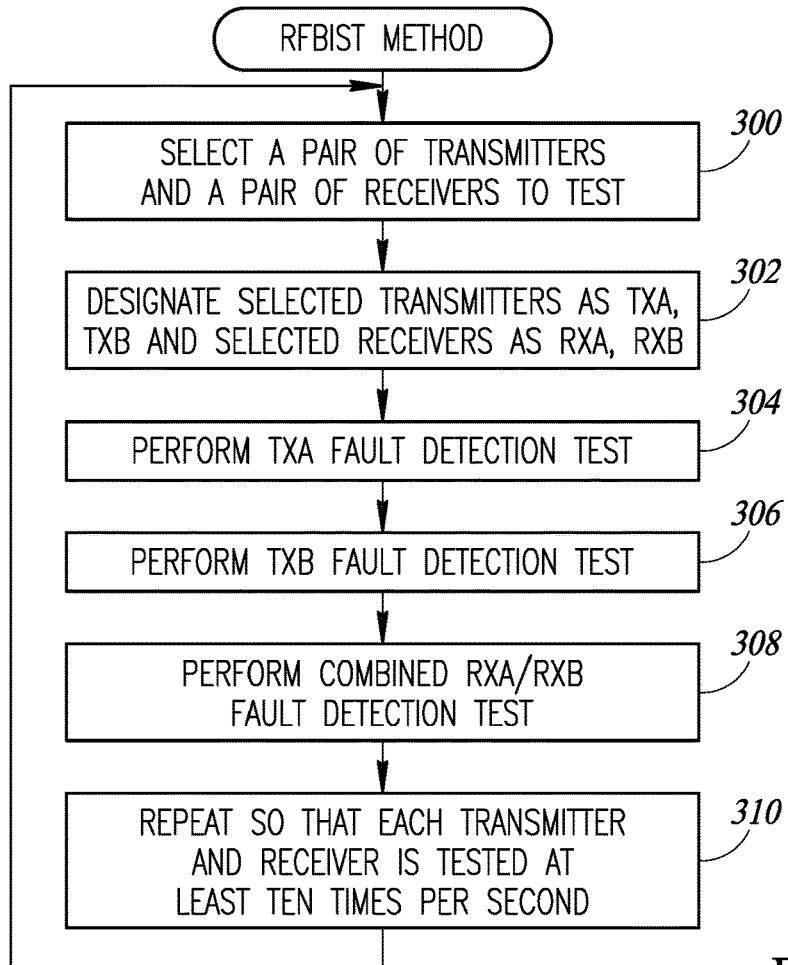
FIG. 14 is a flow chart illustrating an example RFBIST method of the present invention.

A flow chart illustrating an example RFBIST method of the present invention is shown in FIG. 14. In one embodiment, the requirements of the ISO 26262 safety standard is met by testing each transmitter device and receiver device at least ten times per second. The RFBIST method, however, operative on pairs of transmitters and receivers at a time. Thus, to meet the requirements of the standard, the RFBIST method is executed often enough such that every transmitter and receiver is tested at least ten times per second.

First, a pair of transmitters and a pair of receivers are selected for a particular test (step 300). The selected transmitter and receivers are designated TXA, TXB, RXA, and RXB (step 302). The TXA transmitter fault detection test is then performed (step 304), followed by the TXB transmitter fault detection test (step 306). The combined RXA/RXB receiver fault detection test is then performed (step 308). These tests are repeated a sufficient number of times and often enough such that all N transmitter devices and M receiver devices are tested to meet the requirements of the relevant safety standard, e.g., ten times per second for the ISO 26262 safety standard.

Note that these tests are preferably performed with minimal impact on the regular operation of the radar system. In other words, it is desirable that the processing and latency impact on the radar for performing the RFBIST mechanism be zero or minimal at most.

Figure 15:
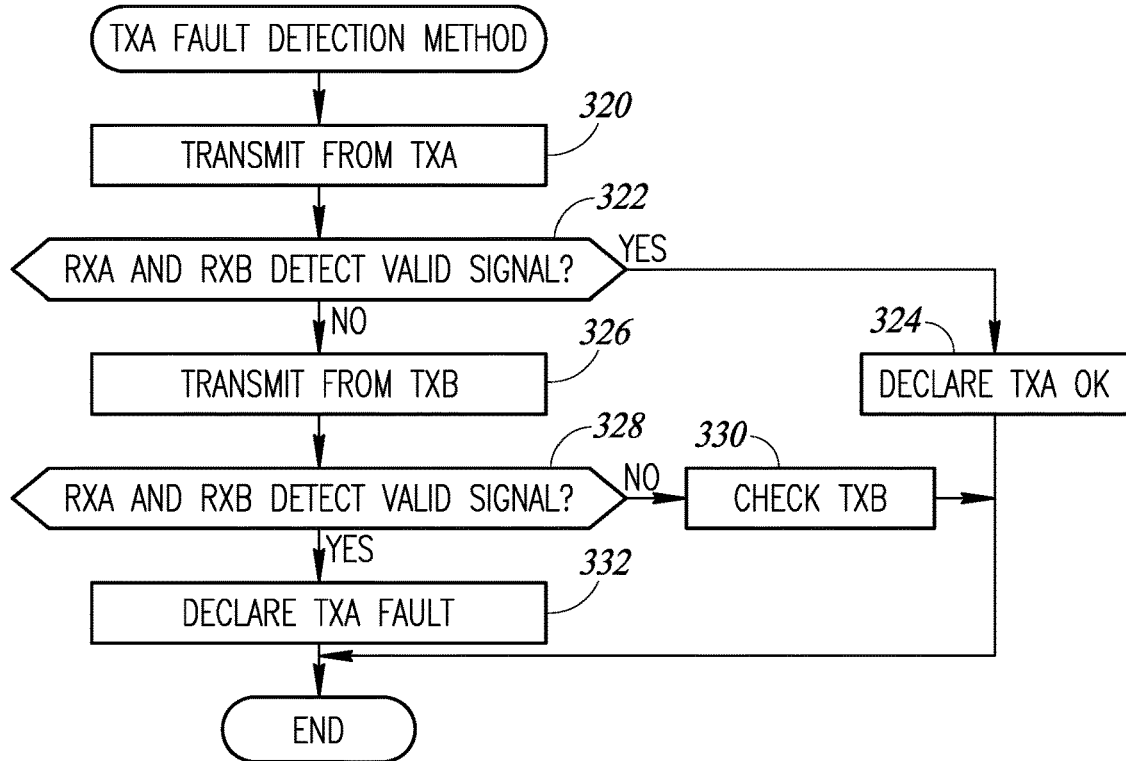
FIG. 15 is a flow chart illustrating an example TXA fault detection method of the present invention.

A flow chart illustrating an example TXA fault detection method of the present invention is shown in FIG. 15. In one embodiment, a transmitter fault is detected by using a second transmitter to verify the validity of the transmitted signal. First, a signal is transmitted from TXA (step 320). If both receivers RXA and RXB detect valid signals (step 322), then TXA is declared operational and no fault detected (step 324). If, however, receivers RXA and RXB do not detect a valid signal (step 322), then it may be that transmitter TXA is faulty. To verify this, a signal is transmitted from the other transmitter TXB (step 326).

If both receivers RXA and RXB detect valid signals (step 328), then a fault in the first transmitter TXA is declared (step 332). If, however, both receivers RXA and RXB do not detect valid signals (step 328), then it is possible that TXB is faulty and should be checked (step 330). It is also possible that both receivers RXA and RXB are also faulty but the likelihood is relatively low. Both receivers are tested independently in any event.

Figure 18:
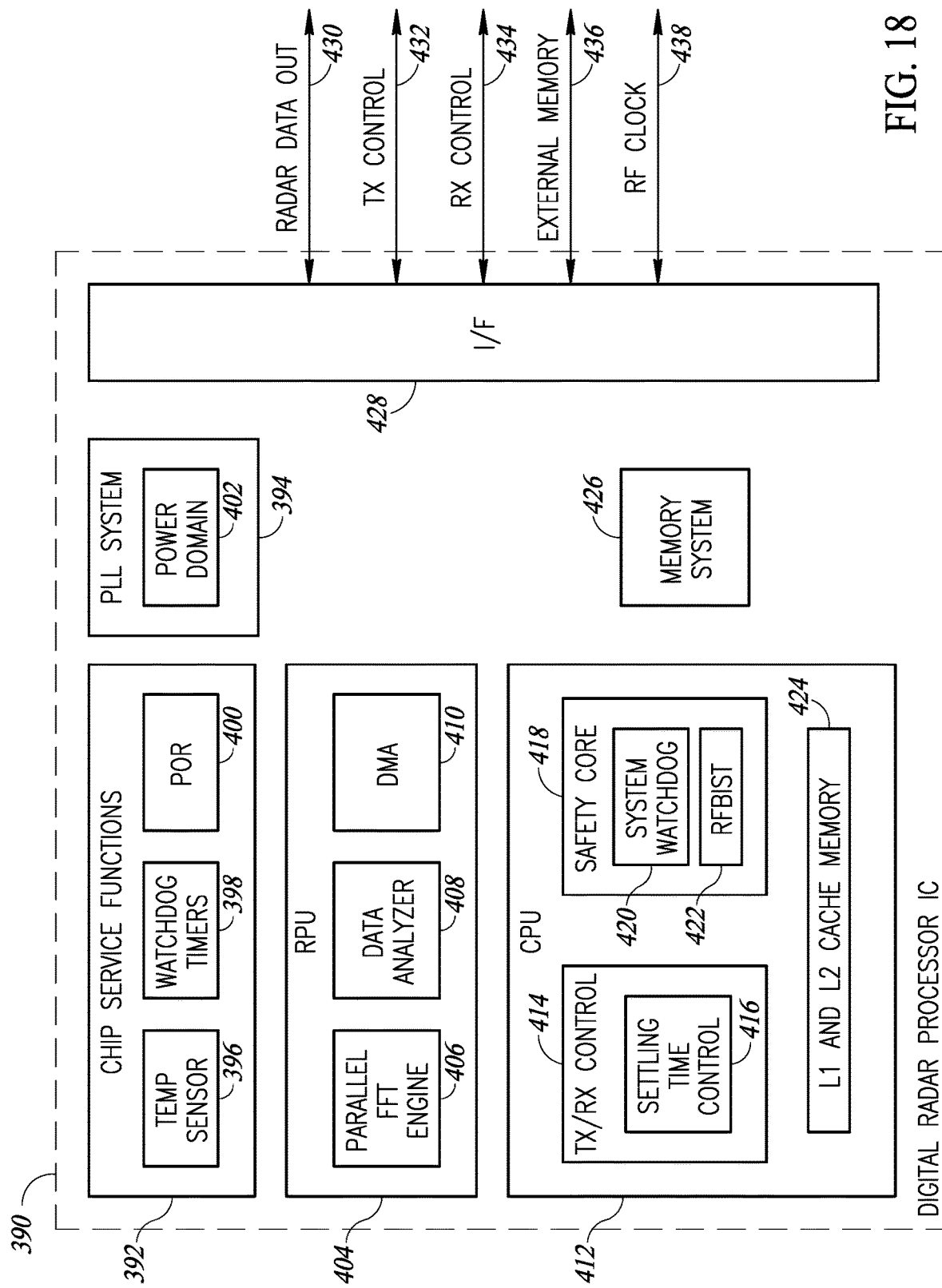
FIG. 18 is a block diagram illustrating an example digital radar processor IC of the present invention.

Note that the method of detecting valid signals may comprise any suitable technique for determining whether the signal received at a receiver device is acceptable. For example, the signal to be analyzed may be taken from the output of the ADC before any FFT processing (e.g., range FFT) is performed on the signal by the radar processing unit (RPU) 404 (FIG. 18). Any desired characteristics of the radar signal may be used to determine signal validity. In one embodiment, the radar transceiver is calibrated at the time of manufacture such as in an anechoic chamber. During the calibration process, one or more metrics or characteristics related to a reference radar signal are determined and stored in the processor IC or otherwise made available for future reference by the radar system. Examples of characteristics include expected power density distribution measurements, power histograms, frequency, frequency bandwidth, average frequency, etc. In one embodiment, during the factory calibration process, the entire system electrical response (including the antenna and RF paths) is recorded. Note that preferably, the calibration is performed in a controlled environment (e.g., RF isolated anechoic chamber). As part of calibration process, the data is recorded and extracted to optimize the settings of the radar. The data recorded can be used to check the correlation (cross-correlation) between channels during operation of the radar.

When a receiver receives a signal from a transmitter, one or more characteristics of the signal are compared to those stored in memory, e.g., correlated. If the correlation results are close enough, i.e. they exceed a static or dynamic threshold (and may be set by the user), the received signal is declared valid. For example, power histograms can be generated after one or more FFTs per TX-RX pair (i.e. part of the radar processing).

Note that when active, the radar is constantly performing transmit and receive actions. The RFBIST operations and processing are preferably performed in the background without any performance degradation to the main operation of the radar. The difference between adjacent receive channels is the distance the transmit signal travels and variance in the reflection coefficient from the target. The received signal can have signal properties which are similar to other channels with differences caused by the reflection coefficient and traveling distance. In regular operation of the radar, it is expected that properties like received average power and power distribution of the signal will have good correlation from one receiver to another. This fact can be used to identify faulty channels.

In addition, the radar chirp frequency can be monitored in real time by the receiver devices. In one embodiment, the frequency of the LO signal at the receiver during the frequency ramp can be estimated and compared in real time to the expected frequency ramp. This eliminates the need for lock detection at the transmitter.

For example, when an abnormal power distribution is received and detected, the system alerts a higher-level hierarchy that the system is impaired. The system, however, can recover by masking (i.e. ignoring) the channels that are defective, i.e. calculating and determining which parts of the antenna array and TX/RX circuits have been found faulty and not considering them in generating the output radar image data. Moreover, in one embodiment, the system powers down any channels in the array that have been found faulty in order to save power. Note that the higher-level is operative to manage the sensors and fuse the data to actuate physical operation of the vehicle (i.e. accelerate, brake, stop, turn, etc.).

Figure 16:
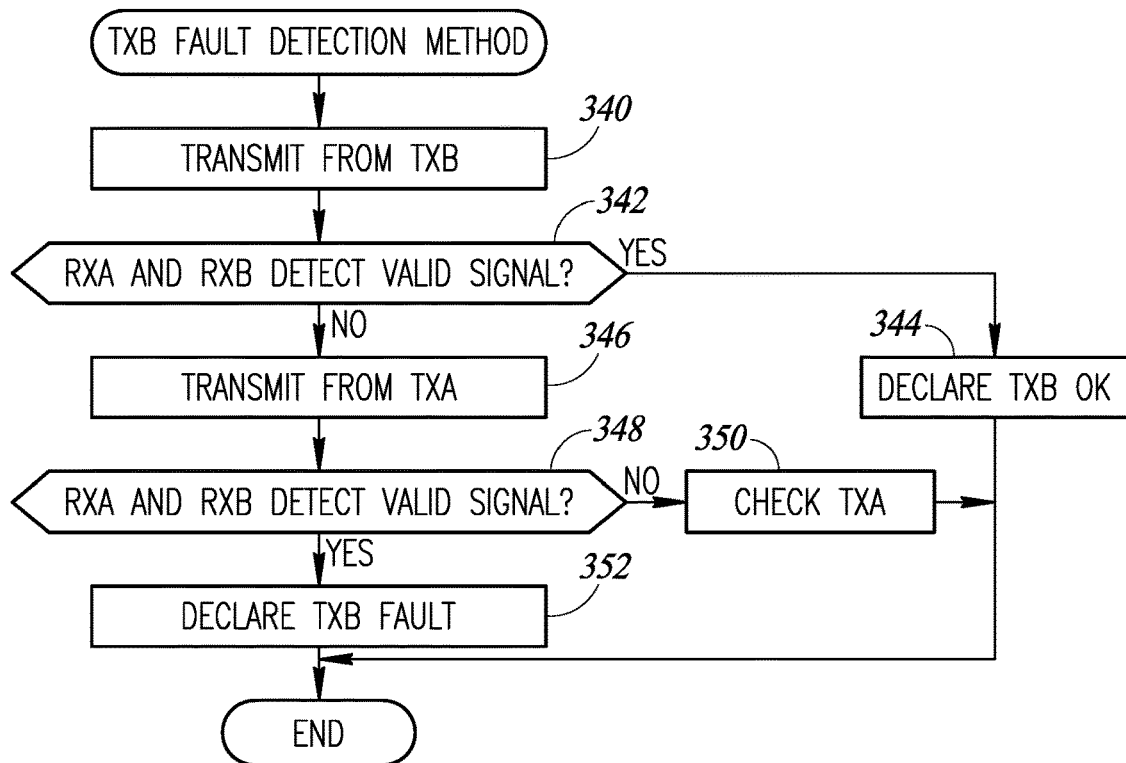
FIG. 16 is a flow chart illustrating an example TXB fault detection method of the present invention.

A flow chart illustrating an example TXB fault detection method of the present invention is shown in FIG. 16. Similar to the method to detect a TXA fault, a second transmitter is used to verify the validity of the transmitted signal. First, a signal is transmitted from TXB (step 340). If both receivers RXA and RXB detect valid signals (step 342), then TXB is declared operational and no fault detected (step 344). If, however, receivers RXA and RXB do not detect a valid signal (step 342), then it may be that transmitter TXB is faulty. To verify this, a signal is transmitted from the other transmitter TXA (step 346).

If both receivers RXA and RXB detect valid signals (step 348), then a fault in the second transmitter TXB is declared (step 352). If, however, both receivers RXA and RXB do not detect valid signals (step 348), then it is possible that TXA is faulty and should be checked (step 350). It is also possible that both receivers RXA and RXB are also faulty but the likelihood is relatively low. Both receivers are tested independently in any event.

Figure 17:
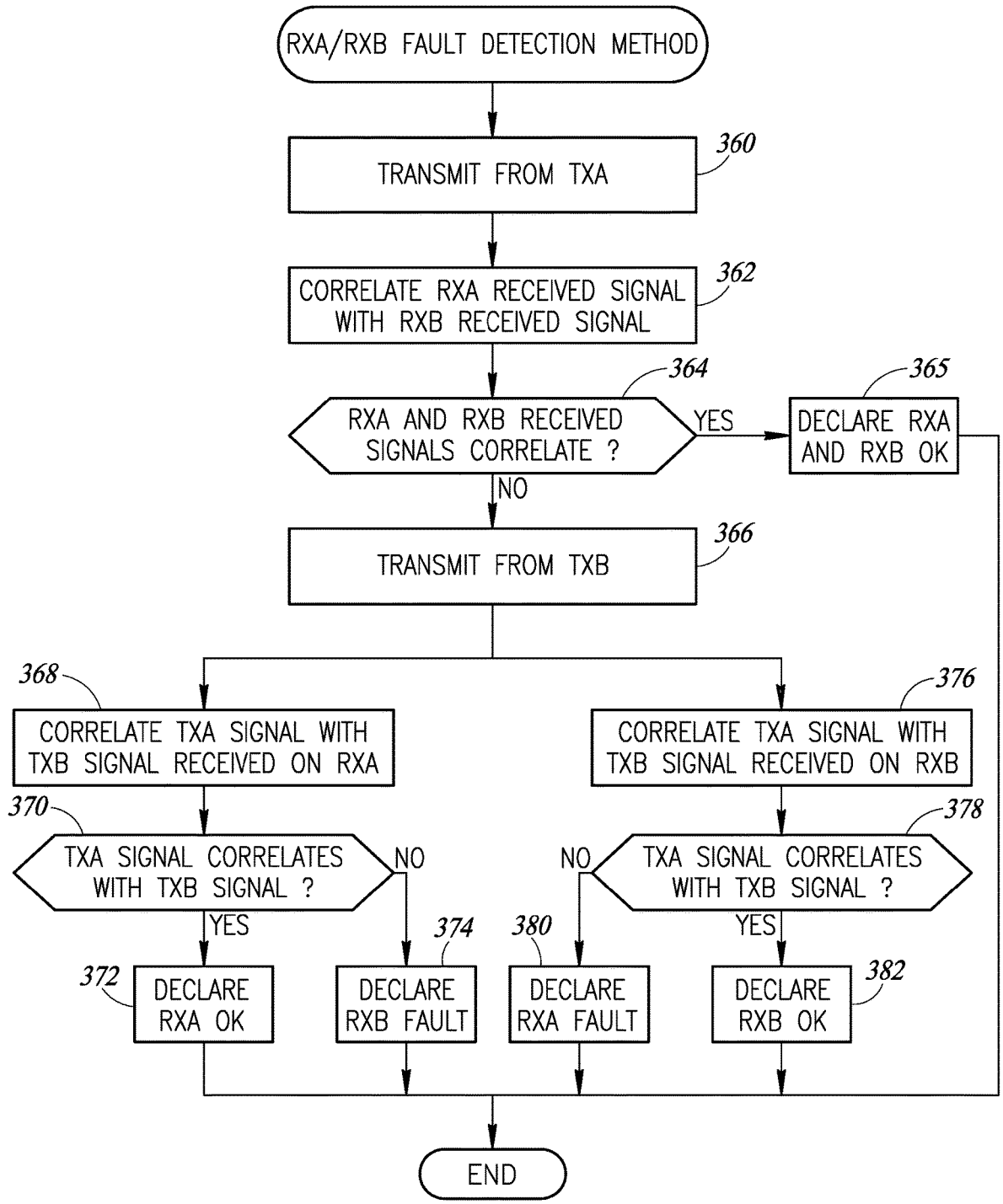
FIG. 17 is a flow chart illustrating an example RXA/RXB fault detection method of the present invention.

A flow chart illustrating an example RXA/RXB fault detection method of the present invention is shown in FIG. 17. In this method, both receivers RXA and RXB are tested and a fault in either can be detected. First, a signal is transmitted from transmitter TXA (step 360). The signal received by receiver RXA is then correlated with the signal received by receiver RXB (step 362). If the correlation results exceed a threshold, i.e. the two received signals match sufficiently (step 364), then both receivers RXA and RXB are declared operational and no fault is detected (step 365).

If, however, the correlation between the two received signal does not exceed the threshold (step 364), then a signal from the other transmitter TXB is transmitted (step 366). At this point, each receiver RXA and RXB has received two signals, one from transmitter TXA and the other from transmitter TXB. The two transmit signals received at each receiver are correlated. Thus, the signals received on receiver RXA from transmitters TXA and TXB are correlated (step 368), as well as the signals received on receiver RXB from transmitters TXA and TXB are correlated (step 376).

If the TXA and TXB signals received at receiver RXA correlate with each other (i.e. the correlation results exceed a predetermined threshold) (step 370), then RXA is declared operational and no RXA fault is detected (step 372). If the TXA and TXB signals received at receiver RXA do not correlate with each other (i.e. the correlation results do not exceed a predetermined threshold) (step 370), then a fault in receiver RXB is declared (step 374).

If the TXA and TXB signals received at receiver RXB correlate with each other (i.e. the correlation results exceed a predetermined threshold) (step 378), then RXB is declared operational and no RXB fault is detected (step 382). If the TXA and TXB signals received at receiver RXB do not correlate with each other (i.e. the correlation results do not exceed a predetermined threshold) (step 378), then a fault in receiver RXA is declared (step 380).

A block diagram illustrating an example digital radar processor IC of the present invention is shown in FIG. 18. The radar processor IC, generally referenced 390, comprises several chip service functions 392 including temperature sensor circuit 396, watchdog timers 398, power on reset (POR) circuit 400, etc., PLL system 394 including power domain circuit 402, radar processing unit (RPU) 404 including parallel FFT engine 406, data analyzer circuit 408 and direct memory access (DMA) circuit 410, CPU block 412 including TX/RX control block 414, safety core block 418, and L1 and L2 cache memory circuit 424, memory system 426 and interface (I/F) circuit 428.

The TX/RX control circuit 414 incorporates settling time control block 416 which implements the mechanism of the present invention for eliminating frequency source settling time, described in detail supra. The safety core block 418 includes system watchdog timer circuitry 420 and RFBIST circuit adapted to implement the RFBIST mechanism of the present invention described in detail supra. The I/F circuit includes interfaces for radar output data 430, TX control 432, RX control 434, external memory 436, and RF clock 438.

Note that the digital radar processor circuit 390 can be implemented on monolithic silicon or across several integrated circuits, depending on the particular implementation. Similarly, the transmitter and receiver circuits can be implemented on a single IC or across several ICs depending on the particular implementation.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of eliminating frequency source settling time in a radar system, the method comprising:
   providing a plurality of frequency sources, each frequency source including a local oscillator and phase locked loop (PLL), said plurality of frequency sources including at least a first frequency source having a first required settling time and a second frequency source having a second required settling time;
   alternating use of said first frequency source and said second frequency source for transmission and reception in accordance with a local oscillator (LO) control circuit;
   permitting said second frequency source to settle while said first frequency source is in use wherein said second frequency source is turned on early enough for it to settle before said first frequency source is turned off, and permitting said first frequency source to settle while said second frequency source is in use wherein said first frequency source is turned on early enough for it to settle before said second frequency source is turned off; and
   wherein alternating use of said first frequency source and said second frequency source eliminates time delays associated with frequency source settling time in the radar system.

2. The method according to claim 1, wherein alternating use of said first frequency source and said second frequency source for transmission and reception comprises:
   connecting, via said LO control circuit, said first frequency source to one or more transmitters and one or more receivers while permitting said second frequency source to settle; and
   connecting, via said LO control circuit, said second frequency source to said one or more transmitters and said one or more receivers while permitting said first frequency source to settle.

3. The method according to claim 2, wherein alternating use of said first frequency source and said second frequency source for transmission and reception comprises:
   disconnecting, via said LO control circuit, said first frequency source from said one or more transmitters and said one or more receivers when transmission and reception using said first frequency source is complete; and
   disconnecting, via said LO control circuit, said second frequency source from said one or more transmitters and said one or more receivers when transmission and reception using said second frequency source is complete.

4. The method according to claim 1, wherein said first frequency source comprises a first phase locked loop (PLL) circuit and said second frequency source comprises a second PLL circuit.

5. An apparatus for eliminating frequency source settling time in a radar system, comprising:
   one or more transmitters;
   one or more receivers;
   a plurality of frequency sources, each frequency source including a local oscillator and phase locked loop (PLL), said plurality of frequency sources including at least a first frequency source having a first settling time and a second frequency source having a second settling time;
   a control circuit operative to alternately couple said first frequency source and said second frequency source to said one or more transmitters and said one or more receivers in accordance with a local oscillator (LO) control circuit, thereby permitting said second frequency source to settle while said first frequency source is in use, wherein said second frequency source is turned on early enough for it to settle before said first frequency source is turned off, and permitting said first frequency source to settle while said second frequency source is in use wherein said first frequency source is turned on early enough for it to settle before said second frequency source is turned off; and
   wherein alternating use of said first frequency source and said second frequency source eliminates time delays associated with frequency source settling time in the radar system.

6. The apparatus according to claim 5, wherein said first frequency source comprises a first phase locked loop (PLL) circuit and said second frequency source comprises a second PLL circuit.

7. The apparatus according to claim 5, wherein said LO control circuit is operative to disconnect said first frequency source from said one or more transmitters and said one or more receivers when transmission and reception using said first frequency source is complete.

8. The apparatus according to claim 5, wherein said LO control circuit is operative to disconnect said second frequency source from said one or more transmitters and said one or more receivers when transmission and reception using said second frequency source is complete.

9. A method of eliminating frequency source settling time in a radar system, the method comprising:
   providing a plurality of frequency sources, each frequency source including a local oscillator and phase locked loop (PLL), said plurality of frequency sources including at least a first frequency source having a first settling time and a second frequency source having a second settling time;
   selecting said first frequency source, via a local oscillator (LO) control circuit, and allowing settling thereof;
   first utilizing said first frequency source for a first transmission and reception;
   selecting said second frequency source, via said LO control circuit, and allowing settling thereof while said first frequency source is in use wherein said second frequency source is turned on early enough for it to settle before said first frequency source is turned off;
   upon completion of said first transmission and reception, turning off said first frequency source;
   second utilizing said second frequency source for a second transmission and reception;
   selecting said first frequency source and allowing settling thereof while said second frequency source is in use wherein said first frequency source is turned on early enough for it to settle before said second frequency source is turned off;
   upon completion of said second transmission and reception, turning off said second frequency source;

continuing with said first utilizing whereby alternating use of said first frequency source and said second frequency source eliminates time delays associated with frequency source settling time in the radar system.

10. The method according to claim 9, wherein said first utilizing comprises connecting said first frequency source to one or more transmitters and one or more receivers while permitting said second frequency source to settle.

11. The method according to claim 9, wherein said second utilizing comprises connecting said second frequency source to one or more transmitters and one or more receivers while permitting said first frequency source to settle.

12. An apparatus for eliminating frequency source settling time in a radar system, comprising:
a plurality of transmitters coupled to one or more antennas, including a first transmitter and a second transmitter, each transmitter including a respective frequency source having a required settling time, each frequency source including a local oscillator and phase locked loop (PLL);
a plurality of receivers;
a control circuit operative to alternately couple said first transmitter and said second transmitter to said one or more antennas, said control circuit operative to permit the frequency source in said second transmitter to settle while said first transmitter is in use wherein said second frequency source is turned on early enough for it to settle before said first frequency source is turned off, and permitting the frequency source in said first transmitter to settle while said second transmitter is in use wherein said first frequency source is turned on early enough for it to settle before said second frequency source is turned off; and
wherein alternating use of said first transmitter and said second transmitter eliminates time delays associated with frequency source settling time in the radar system.

13. The apparatus according to claim 12, wherein said first frequency source comprises a first phase locked loop (PLL) circuit and said second frequency source comprises a second PLL circuit.

14. The apparatus according to claim 12, wherein said control circuit is operative to turn said first frequency source off when transmission and reception using said first frequency source is complete.

15. The apparatus according to claim 12, wherein said control circuit is operative to turn said second frequency source off when transmission and reception using said second frequency source is complete.

16. An automotive radar sensor, comprising:
one or more transmitting antennas;
one or more receiving antennas;
a plurality of transceivers coupled to said one or more transmitting antennas and said one or more receiving antennas, said transceivers operative to generate and supply transmitting signals to said one or more transmitting antennas and receive signals reflected back to said one or more receiving antennas;
a plurality of frequency sources coupled to said plurality of transceivers including at least a first frequency source having a first settling time and a second frequency source having a second settling time, each frequency source including a local oscillator and phase locked loop (PLL);
a control circuit operative to alternately couple said first frequency source and said second frequency source to said plurality of transceivers such that said second frequency source is permitted to settle while said first frequency source is in use wherein said second frequency source is turned on early enough for it to settle before said first frequency source is turned off, and said first frequency source is permitted to settle while said second frequency source is in use wherein said first frequency source is turned on early enough for it to settle before said second frequency source is turned off; and
wherein alternating use of said first frequency source and said second frequency source eliminates time delays associated with frequency source settling time in the automotive radar sensor.

17. The apparatus according to claim 16, wherein said first frequency source comprises a first phase locked loop (PLL) circuit and said second frequency source comprises a second PLL circuit.

18. The apparatus according to claim 16, wherein said control circuit is operative to turn said first frequency source off when transmission and reception using a first transceiver is complete.

19. The apparatus according to claim 16, wherein said control circuit is operative to turn said second frequency source off when transmission and reception using a second transceiver is complete.

* * * * *